United States Patent
Nakamura et al.

(10) Patent No.: US 7,650,144 B2
(45) Date of Patent: Jan. 19, 2010

(54) MONITORING CONTROL APPARATUS, MONITORING SYSTEM, MONITORING METHOD, WIRELESS COMMUNICATION APPARATUS AND WIRELESS COMMUNICATION SYSTEM

(75) Inventors: Akihiko Nakamura, Kyoto (JP); Takaaki Ombe, Kyoto (JP); Jun Hayashi, Kyoto (JP); Noriaki Hayakawa, Kyoto (JP)

(73) Assignee: Omron Corporation, Kyoto (JP)

(*) Notice: Subject to any disclaimer, the term of this patent is extended or adjusted under 35 U.S.C. 154(b) by 536 days.

(21) Appl. No.: 11/362,800

(22) Filed: Feb. 28, 2006

(65) Prior Publication Data
US 2006/0209176 A1    Sep. 21, 2006

(30) Foreign Application Priority Data

| Mar. 1, 2005 | (JP) | 2005-056678 |
|---|---|---|
| Mar. 1, 2005 | (JP) | 2005-056679 |
| Jan. 26, 2006 | (JP) | 2006-017798 |
| Jan. 26, 2006 | (JP) | 2006-017799 |

(51) Int. Cl.
*H04M 3/00* (2006.01)
(52) U.S. Cl. .................. 455/420; 455/418; 455/419; 370/331
(58) Field of Classification Search ......... 455/418–420, 455/404.1, 404.2; 370/331
See application file for complete search history.

(56) References Cited

U.S. PATENT DOCUMENTS

| 6,912,385 | B2* | 6/2005 | Namba et al. ............. 455/419 |
| 7,084,756 | B2* | 8/2006 | Stilp ........................ 340/539.1 |
| 2002/0077077 | A1 | 6/2002 | Rezvani et al. |
| 2004/0130624 | A1 | 7/2004 | Ryley et al. |
| 2004/0155963 | A1 | 8/2004 | Kondo et al. |
| 2004/0192207 | A1 | 9/2004 | Ketola |
| 2004/0266493 | A1 | 12/2004 | Bahl et al. |
| 2006/0041750 | A1* | 2/2006 | Carter et al. ............ 713/168 |

FOREIGN PATENT DOCUMENTS

| CN | 1501601 | 6/2004 |
| JP | 2001-266296 | 9/2001 |
| JP | 2002-112347 | 4/2002 |
| JP | 2002-135824 | 5/2002 |
| JP | 2002-165211 | 6/2002 |
| JP | 2004-012197 A | 1/2004 |
| JP | 2004-128821 A | 4/2004 |

(Continued)

*Primary Examiner*—Nick Corsaro
*Assistant Examiner*—Vladimir Magloire
(74) *Attorney, Agent, or Firm*—Foley & Lardner LLP

(57) ABSTRACT

A main controller used in a security system having a sensor or a camera performs wireless communication with the sensor or the camera so as to control the sensor or the camera. The main controller has a plurality of communication sections that perform wireless communication by using communication systems having different communication speeds. The camera transmits and receives information by performing wireless communication with the main controller. The camera is provided with a first camera communication section and a second camera communication section that perform wireless communication by using communication systems having different communication speeds, and a camera communication control section for selecting the first camera communication section and the second camera communication section according to the information to be transmitted and received, as a communication section to perform communication.

5 Claims, 11 Drawing Sheets

FOREIGN PATENT DOCUMENTS

| | | |
|---|---|---|
| JP | 2004-194111 A | 7/2004 |
| JP | 2004-200998 A | 7/2004 |
| JP | 2005-168041 | 6/2005 |
| WO | WO 01/91376 A1 | 11/2001 |
| WO | WO 2005/122710 A2 | 12/2005 |

* cited by examiner

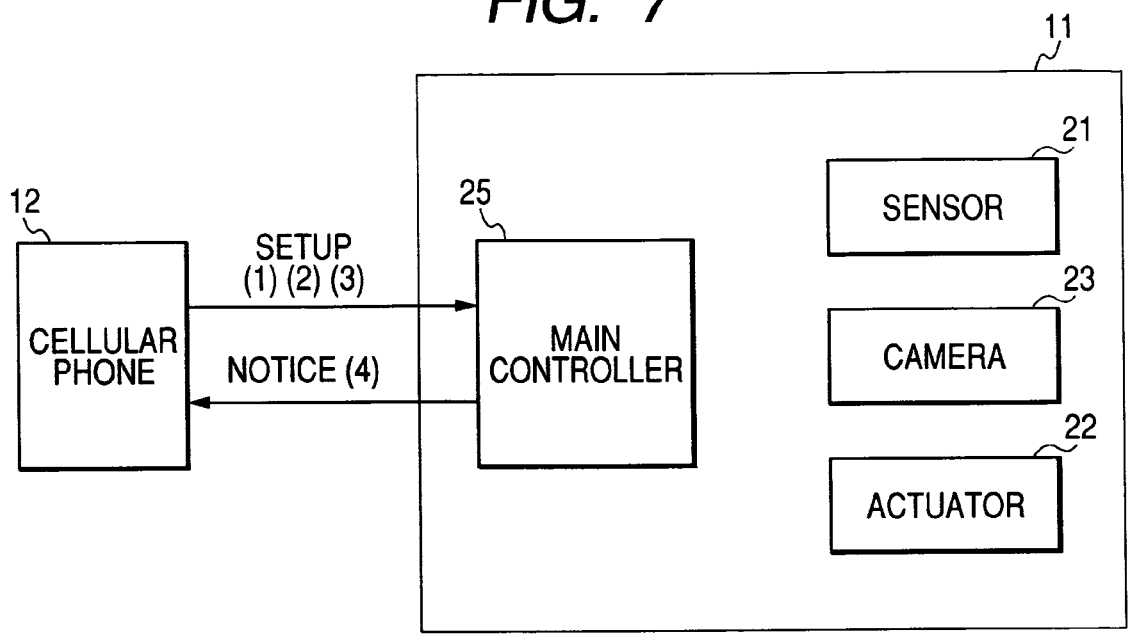
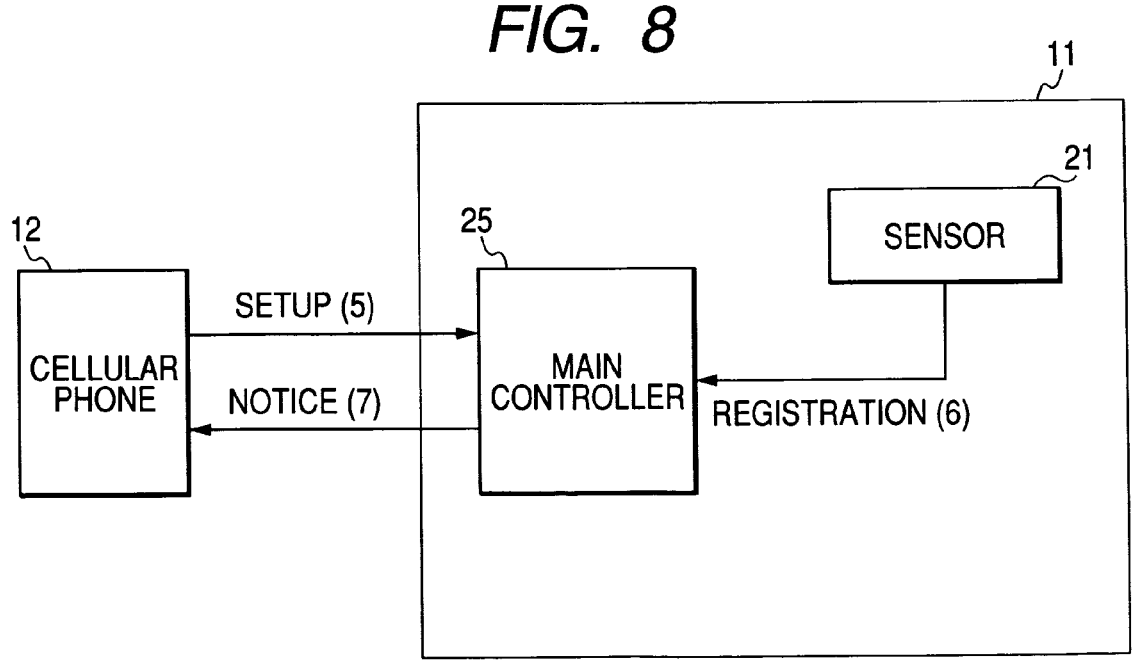

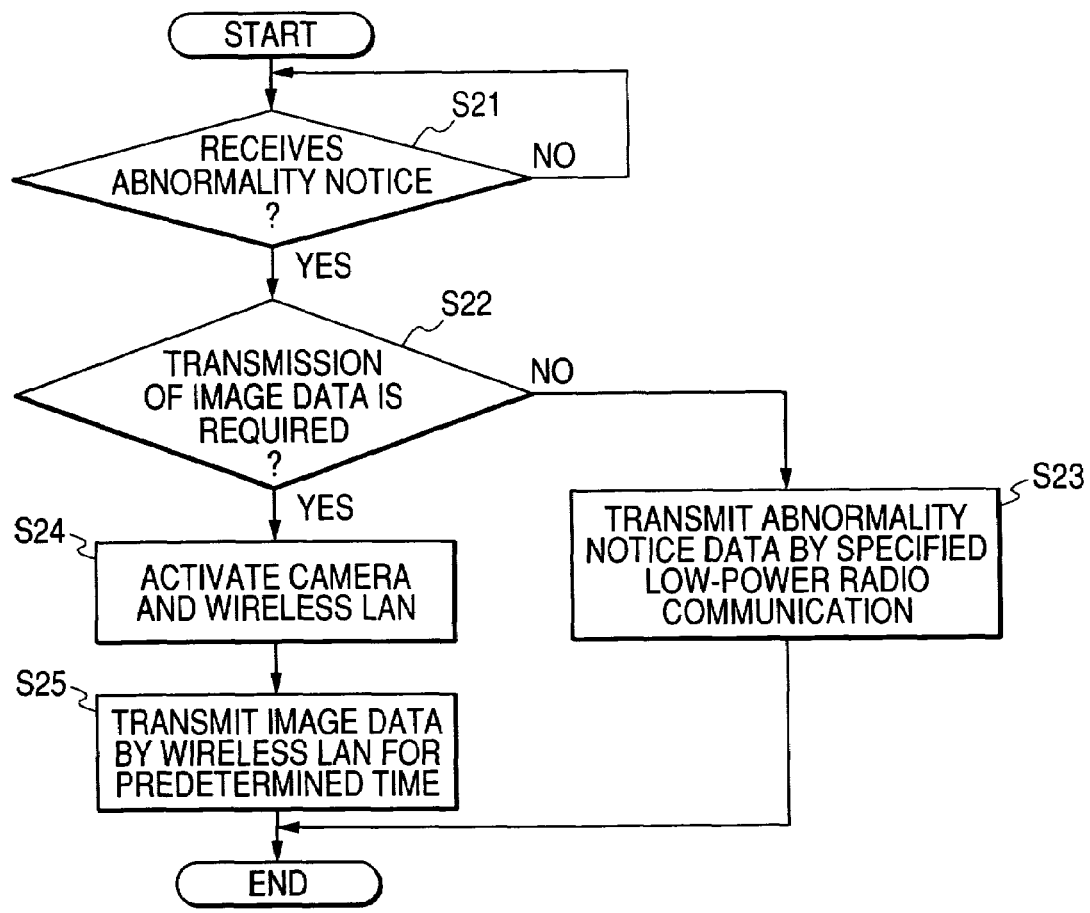

MONITORING CONTROL APPARATUS, MONITORING SYSTEM, MONITORING METHOD, WIRELESS COMMUNICATION APPARATUS AND WIRELESS COMMUNICATION SYSTEM

This application claims foreign priorities based on Japanese Patent application No. 2005-056678 filed on Mar. 1, 2005, Japanese Patent application No. 2005-056679 filed on Mar. 1, 2005, Japanese Patent application No. 2006-017798 filed on Jan. 26, 2006, and Japanese Patent application No. 2006-017799 filed on Jan. 26, 2006, the contents of which are incorporated herein by reference in their entirety.

BACKGROUND OF THE INVENTION

1. Field of the Invention

The present invention relates to a monitoring control apparatus, a monitoring system, a monitoring method, a wireless communication apparatus, a wireless communication system, and a wireless communication method. More particularly, the present invention relates to a monitoring control apparatus, a monitoring system, a monitoring method, a wireless communication apparatus, a wireless communication system, and a wireless communication method, which can perform communication by using communication systems having different communication speeds.

2. Description of the Related Art

In the related art, in a place, such as a house, a work place and a school, where a person stays for a predetermined time (hereinafter, simply referred to as "house"), various methods of managing security have been suggested. For example, a security system has been already put to practical use in which various sensors are provided in a house or in the periphery of the house so as to monitor the states of the house inside and outside. Alternatively, in such a security system, a camera for imaging the states of the house inside and outside may be provided.

In general, the security system has a controller for controlling a plurality of sensors provided in the house inside and outside, the controller being connected to the individual sensors for communication. The controller is configured to perform predetermined security management on the basis of the detection results of the sensors.

Further, in such a security system, normally, the controller performs wire communication with the sensors or performs wireless communication with the sensors by using a specified low-power radio communication system (a specified low-power radio communication).

Moreover, in other security systems, there is a case in which cameras are provided so as to image the states of the house inside and outside. The cameras perform wire or wireless communication with the controller. Image data imaged by the camera has a large data amount, and thus, when the camera performs wireless communication with the controller, a wireless communication system (wireless LAN) based on IEEE 802.11b standard or the like is used. However, the sensors other than the cameras perform wire communication with the controller (for example, refer to JP-A-2004-128821 and JP-A-2004-194111).

However, when the controller performs wire communication with the sensors or the cameras, since communication lines are provided to places where the sensors or the cameras are installed, the places where the sensors or the cameras are installed are limited. For this reason, the controller preferably performs wireless communication with the sensors or the cameras.

When the specified low-power radio communication is used for the wireless communication between the controller, and the sensors and the cameras, the controller can perform wireless communication with the sensors, but transmission and reception of image data imaged by the cameras cannot be performed. That is, the controller can not perform communication with the cameras.

On the other hand, when the wireless LAN system is used for the wireless communication between the controller, and the sensors and the cameras, transmission and reception of data having large data amount, such as the image data imaged by the cameras, can be performed, and also the communication with other sensors can be performed.

When the communication is performed by the wireless LAN system, the sensors and the cameras need to check whether some data is received from the controller, even in a standby state. Thus, the controller continuously performs communication with the sensors and the cameras. For this reason, power consumption in individual terminal is significantly increased. In particular, when a battery is used as a power supply for driving a sensor or a camera, since power consumption is high, battery life is drastically made short, and thus it has no practical use. Therefore, the sensor or the camera needs to be connected to a power supply such as an AC (alternating-current) power, for driving the sensor or the camera. However, also in this case, the places where the sensors or the cameras are installed are still limited.

That is, a monitoring control apparatus and a wireless communication apparatus have not been proposed yet in which wireless communication by using different communication systems such as the specified low-power radio communication and the wireless LAN system are performed, and in which the communication system to be used is changed according to data to be sent and received.

SUMMARY OF THE INVENTION

An object of the invention is to provide a monitoring control apparatus, a monitoring system and a monitoring method, in which wireless communication by using communication systems having different communication speeds, such as a specified low-power radio communication and a wireless LAN system are performed. Further object of the invention is to provide a wireless communication apparatus, a wireless communication system and a wireless communication method, in which wireless communication by using communication systems having different communication speeds, such as a specified low-power radio communication and a wireless LAN system are performed, and in which driving by a buttery is possible.

According to a first aspect of the invention, a monitoring control apparatus used in a monitoring system having at least one information acquiring device for acquiring information related to a state of an environment of a peripheral region of the information acquiring device, the monitoring control apparatus comprises: a plurality of communication sections for performing wireless communication by using communication systems having different communication speeds, wherein the monitoring control apparatus controls the information acquiring device to acquire the information by performing the wireless communication.

In some implementations, a wireless communication apparatus of the invention comprises: a plurality of communication sections for performing wireless communication by using communication systems having different communication speeds; and a selecting section for selecting the communication section to be used in communication according to information to be sent and received.

The wireless communication apparatus of the invention may further comprise: an information acquiring section for acquiring information related to a state of an environment of a peripheral region of the wireless communication apparatus.

According to this configuration, the monitoring control apparatus is used in the monitoring system having the information acquiring device, and performs wireless communication with the information acquiring device so as to control the information acquiring device. For example, the control includes a control of acquisition of information by the information acquiring device, and a control of transmission and reception of the acquired information.

Moreover, the peripheral region is a peripheral region excluding the information acquiring device, in a region where the information acquiring device itself is provided. Further, as the information regarding the states of the environment of the region, information regarding a change in state or a change in environment of the region, or information regarding an image of a landscape or scenery of the region can be exemplified. That is, the peripheral region represents a region (range) where the information acquiring device can acquire the information.

Further, the monitoring control apparatus and the wireless communication apparatus have the plurality of communication sections that perform wireless communication by using communication systems having different communication speeds. For this reason, wireless communication is performed by changing the communication section, and thus wireless communication having different communication speeds can be implemented. Moreover, the communication speed represents a data amount of transmittable and receivable information per unit time. As the communication speed is high, the data amount of transmittable and receivable information increases.

That is, by selecting an optimum communication section according to a type or data amount of communication information, efficient and reliable communication can be implemented. For example, at the time of transmission and reception of the information having a large data mount, the communication is performed by using a communication section having a high communication speed. Further, at the time of transmission and reception of the information having a small data amount, the communication is performed by using a communication section having a low communication speed. Therefore, efficient and reliable communication can be implemented. Further, in general, driving power of the communication section having a high communication speed is larger than driving power of the communication section having a low communication speed. Therefore, by performing the communication in such a manner, the communication systems having different communication speeds can be used, and thus power consumption can be suppressed to the minimum.

In the monitoring control apparatus of the invention, the plurality of communication sections includes: a first communication section for performing wireless communication by using a first communication system; and a second communication section for performing wireless communication by using a second communication system having a communication speed higher than that of the first communication system.

In the monitoring control apparatus of the invention, the first communication system is a specified low-power radio communication, and the second communication system is a wireless LAN (local area network).

In the wireless communication apparatus of the invention, the plurality of communication sections includes: a first communication section for performing wireless communication by using a first communication system; and a second communication section for performing wireless communication by using a second communication system having a communication speed higher than that of the first communication system.

In the wireless communication apparatus of the invention, the first communication system is a specified low-power radio communication, and the second communication system is a wireless LAN (local area network).

According to this configuration, wireless communication can be performed by using the specified low-power radio communication having advantages such as fast establishment of communication, a long communication range and low power consumption, and also by using the communication system having a faster communication speed. Therefore, efficient transmission and reception of the information can be performed, and power consumption can be suppressed to the minimum.

The wireless LAN system is, for example, a wireless communication based on IEEE 802.11b standard. That is, the wireless LAN system has an advantage such as a faster communication speed than that of the specified low-power radio communication. Therefore, by using the communication systems having different communication speeds, efficient transmission and reception of the information can be performed, and power consumption can be suppressed to the minimum.

The monitoring control apparatus of the invention further comprises a transmission request sending section for sending a transmission request of specific data to the information acquiring device through the first communication section; and a specific data receiving section for receiving the specific data from the information acquiring device through the second communication section.

The monitoring control apparatus includes the first communication section for performing wireless communication by using the first communication system; and the second communication section for performing wireless communication by using the second communication system having a communication speed higher than that of the first communication system. Then, the transmission request sending section sends the transmission request of the specific data to the information acquiring device through the first communication section, and the specific data receiving section receives the specific data from the information acquiring device through the second communication section.

Data having a large data amount of which transmission time is long to be sent by the first communication system is previously defined as the specific data. Thus, a transfer time of the specific data is shortened.

The information acquiring device is possibly installed in a place desired by a user. At that time, there is a case where there is no AC power supply near the information acquiring device, and the information acquiring device need to be driven by a buttery. On the other hand, a power requirement when the second communication system is used is generally less than a power requirement when the first communication system having the communication speed lower than that of the second communication system is used. Thus, the information acquiring device uses the second communication system only when the transmission request that is sent by the transmission request sending section of the information acquiring device is received. Therefore, the power used in the communication system is suppressed to the minimum.

By performing the above communication, it is possible to used the communication systems having different communication speeds, so that the power consumption in the information acquiring device is suppressed to the minimum.

The monitoring control apparatus of the invention further comprises: a second communication section activating section for activating the second communication section when the transmission request sending section sends the transmission request, the second communication section being in a standby state in which the communication is continuously possible by the second communication system.

The wireless communication apparatus of the invention further comprises: a transmission request receiving section for receiving a transmission request of the specific data through the first communication section; and a second communication section activating section for activating the second communication section when the transmission request receiving section receives the transmission request.

According to the above configuration, since the second communication section is in the standby state in which the communication is continuously possible by the second communication system, the second communication section needs a driving power for a predetermined amount even though data transmission and reception is not actually performed. However, the second communication section activating section activates the second communication section only when the transmission request sending section sends the transmission request. That is, only when the specific data is to be received, the second communication section is activated. Thus, the power required for the second communication section can be suppressed to the minimum.

The wireless communication apparatus of the invention further comprises: a detecting section for detecting an abnormality in the state of the environment; and an activating section for activating the second communication section and sending an instruction to the imaging section to start imaging when the detecting section detects the abnormality, wherein the selecting section sends the image data according to the instruction from the activating section through the second communication section.

According to the above configuration, the image data taken by the imaging section is transmitted when the detecting section detects the abnormality. Then, the selecting section sends the image data through the second communication section. Since the image data is a data having a large data amount, the transmission can be completed in a short time by using the second communication section having a high communication speed.

According to the above configuration, since the second communication section is in the standby state in which the communication is continuously possible by the second communication system, the second communication section needs a driving power for a predetermined amount even though data transmission and reception is not actually performed. However, the activating section activates the second communication section only when the detecting section detects the abnormality. That is, only when the specific data is to be received, the second communication section is activated. Thus, the power required for the second communication section can be suppressed to the minimum.

In the monitoring control apparatus of the invention, the specific data has a data amount equal to or larger than a threshold value. Alternatively, in the monitoring control apparatus of the invention, the specific data requires time equal to or more than a threshold value to be sent from the information acquiring device to the monitoring control apparatus when the specific data is sent by the first communication system.

In the wireless communication apparatus of the invention, the selecting section selects the second communication section in a case where specific data having a data amount equal to or larger than a threshold value is sent, and the selecting section selects the first communication section in a case where data other than the specific data is sent.

Thus, the specific data having the large data amount is received efficiently in a short time by using the second communication system having a high communication speed.

The wireless communication apparatus of the invention further comprises: a data identification information storage for storing data identification information corresponding to the specific data, wherein the selecting section selects the first communication section or the second communication section based on whether data identification information extracted from transmission data is stored in the data identification information storage.

According to this configuration, the data identification information corresponding to the specific data having the data amount equal to or larger than the threshold value is previously stored in the data identification information storage. Thus, the selecting section can select the first communication section or the second communication section is used for transmission just by checking whether the data identification information extracted from the transmission data is stored in the data identification information storage. Thus, the configuration of the selecting section can be simplified.

In the monitoring control apparatus of the invention, the at least one information acquiring device includes an imaging device for imaging the state of the environment of the peripheral region of the imaging device, and the second communication section performs the wireless communication with the imaging device. Also, in the monitoring control apparatus of the invention, the at least one information acquiring device may include a detecting device for detecting a change in the state of the peripheral region of the detecting device.

In the monitoring control apparatus of the invention, the at least one information acquiring device includes an imaging device for imaging the state of the environment of the peripheral region of the imaging device, and the specific data is image data that is imaged by the imaging device.

In the wireless communication apparatus of the invention, the information acquiring section is an imaging section for imaging the peripheral region. In the wireless communication apparatus of the invention, the information to be sent and received includes image data that is imaged by the imaging section, and in a case of the image data, the selecting section selects the second communication section which performs the wireless communication by using a wireless LAN (local area network), and in a case of data other than the image data, the selecting section selects the first communication section which performs the wireless communication by using a specified low-power radio communication.

In the wireless communication apparatus of the invention, the information acquiring section is an imaging section for imaging the peripheral region, and the specific data is image data that is imaged by the imaging section.

According to this configuration, by the detecting device, the information regarding the change in state in its peripheral region can be continuously acquired. Further, the monitoring control apparatus can acquire the information from the information acquiring device by using wireless communication. That is, the information acquiring device has a sensor function. On the other hand, by the imaging device (imaging section), the state of the environment in its peripheral region can be imaged. That is, the information acquiring device (the wireless communication apparatus) has a camera function.

According to this configuration, transmission and reception of image data taken by the imaging device can be performed by using the communication system having a faster communication speed than that of the specified low-power radio communication. That is, at the time of transmission and reception of the data having a large data amount such as image data or the like, the communication section having a faster communication speed is used. Therefore, efficient transmission and reception of the information can be performed, and power consumption can be suppressed to the minimum.

The monitoring control apparatus of the invention further comprises: an external communication section for performing communication with a portable terminal through an external network, the external communication section sending the information acquired by the information acquiring device to the portable terminal. Alternatively, the monitoring control apparatus of the invention further comprises: an external communication section for performing communication with a portable terminal through an external network; and a specific data transfer section for sending the specific data to the portable terminal by the external communication section, the specific data being received from the information acquiring device.

According to this configuration, since the monitoring control apparatus is connected to the external network for communication, for example, the information acquired by the information acquiring device can be transmitted to the outside or an access to the monitoring control apparatus from the outside can be performed.

According to this configuration, at a place distant from the monitoring control apparatus, an access to the monitoring control apparatus can be performed through the portable terminal.

In a second aspect of the invention, a monitoring system comprises: at least one information acquiring device for acquiring information related to a state of an environment of a peripheral region of the information acquiring device; and the monitoring control apparatus of the first aspect of the invention, wherein the monitoring control apparatus monitors the region by using the information acquired by the information acquiring device. Here, the monitoring control apparatus monitors the region by using the acquisition result of the acquiring device.

In some implementations, a wireless communication system of the invention comprises: the wireless communication apparatus of the invention; and a controlling apparatus which sends the transmission request of the specific data to the wireless communication apparatus, and acquires the specific data from the wireless communication apparatus.

According to this configuration, by selecting an optimum communication section according to the type of data or the data amount of communication information, efficient and reliable communication can be implemented, and power consumption can be suppressed to the minimum.

In a third aspect of the invention, a monitoring method used in a monitoring system having at least one information acquiring device for acquiring information related to a state of an environment of a peripheral region of the information acquiring device, the monitoring control method comprises: performing wireless communication with the at least one information acquiring device by using communication systems having different communication speeds; and controlling the information acquiring device to acquire the information.

In some implementations, a wireless communication method comprises: selecting a communication system from a plurality of communication systems having different communication speeds, the communication system corresponding to information to be sent and received; and sending and receiving the information by using the selected communication system by wireless communication.

According to this configuration, by selecting an optimum communication section according to the type of data or the data amount of communication information, efficient and reliable communication can be implemented, and power consumption can be suppressed to the minimum.

In the monitoring method of the invention, the wireless communication is performed by using a first communication system, and a second communication system having a communication speed higher than that of the first communication system. In the monitoring method of the invention, the first communication system is a specified low-power radio communication, and the second communication system is a wireless LAN (local area network).

In the wireless communication method of the invention, the plurality of communication systems includes a specified low-power radio communication and a wireless LAN (local area network).

According to this configuration, wireless communication can be performed by using the specified low-power radio communication having advantages such as fast establishment of communication, a long communication range, and low power consumption, and by using the communication system having a faster communication speed. Therefore, efficient transmission and reception of the information can be performed, and power consumption can be suppressed to the minimum.

In the monitoring method of the invention, the communication system having the higher communication speed than that of the specified low-power radio communication is a wireless LAN system. According to this configuration, the wireless LAN system has an advantage such that the communication speed is faster than that of the specified low-power radio communication. Therefore, by using the communication systems having different communication speeds, efficient transmission and reception of the information can be performed, and power consumption can be suppressed to the minimum.

The monitoring method of the invention further comprises: sending a transmission request of specific data to the information acquiring device by using the first communication system; and receiving the specific data from the information acquiring device by using the second communication system.

In the wireless communication method of the invention, a second communication system is selected in a case where specific data having a data amount equal to or larger than a threshold value is sent, the second communication system having a communication speed higher than that of a first communication system, and the first communication section is selected in a case where data other than the specific data is sent.

In the wireless communication method of the invention, the information includes image data, the image data is sent and received by using the wireless LAN, and the information other than the image data is sent and received by using the specified low-power radio communication.

According to this configuration, an optimum communication system can be selected according to the types of data to be received. Thus, efficient and reliable communication can be implemented, and power consumption can be suppressed to the minimum.

In the monitoring method of the invention, it is preferable that, when the at least one information acquiring device includes an imaging device that images the states of the environment of its peripheral region, the communication between the imaging device and the monitoring control apparatus is performed by using the wireless LAN system. According to this configuration, transmission and reception of image data taken by the imaging device can be performed by using the communication system having a faster communication speed than that of the specified low-power radio communication. That is, at the time of transmission and reception of the data having a large data amount such as image data or the like, the communication speed having a faster communication speed is used. Therefore, efficient transmission and reception of the information can be performed, and power consumption can be suppressed to the minimum.

A computer may serve as the monitoring control apparatus or the wireless communication apparatus of the invention. In this case, a program that makes a computer to perform as the monitoring control apparatus or the wireless communication apparatus by operating the computer as the above described sections, and a computer readable medium in which the program is recorded may be in a scope of the invention.

As described above, the monitoring control apparatus of the invention which is used in a monitoring system having at least one information acquiring device for acquiring information related to a state of an environment of a peripheral region of the information acquiring device, the monitoring control apparatus comprises: a plurality of communication sections for performing wireless communication by using communication systems having different communication speeds, wherein the monitoring control apparatus controls the information acquiring device to acquire the information by performing the wireless communication. Therefore, the communication systems having different communication speeds can be used, and thus power consumption can be suppressed to the minimum.

As described above, the wireless communication apparatus of the invention comprises: a plurality of communication sections for performing wireless communication by using communication systems having different communication speeds; and a selecting section for selecting the communication section to be used in communication according to information to be sent and received. Therefore, power consumption can be suppressed to the minimum.

BRIEF DESCRIPTION OF THE DRAWINGS

FIG. 7 is a block diagram showing a flow (data transmission and reception) when various kinds of setups and registration of the security system are performed, in accordance with an embodiment of the invention.

FIG. 8 is a block diagram showing a flow (data transmission and reception) when various kinds of setups and registration of the security system are performed, in accordance with an embodiment of the invention.

FIG. 17 is a block diagram showing a flow of a processing in a camera as shown in FIG. 16 when a built-in sensor detects an abnormality.

FIG. 18 is a diagram showing one storing example in a correspondence between communication section and transmission data storing section.

DESCRIPTION OF THE PREFERRED EMBODIMENTS

An embodiment of the invention will now be described with reference to FIGS. 1 to 18. Moreover, in a security system in this embodiment, so-called home security in which a security in a house is monitored will be specifically described, but it is not intended to limit the invention to the home security.

[A: Configuration of Security System]

Figure 2:
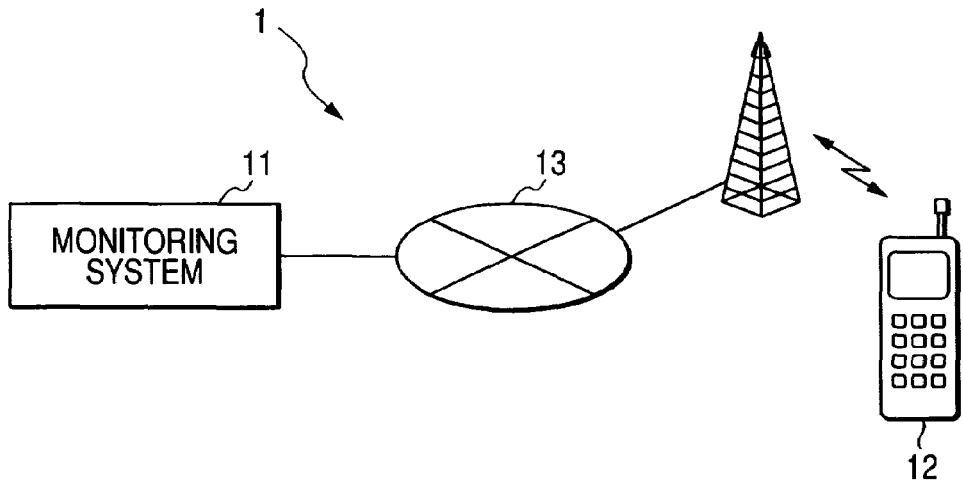
FIG. 2 is a block diagram showing an essential configuration of a security system in accordance with an embodiment of the invention.

FIG. 2 is a schematic view showing a schematic configuration of a security system 1 according to the embodiment of the invention. As shown in FIG. 2, the security system 1 includes a monitoring system 11 and a cellular phone (portable terminal) 12. The monitoring system 11 and the cellular phone 12 are connected to each other through an external network 13 for communication.

The monitoring system 11 monitors various states in a region (security region) where a security of the house inside and outside is provided. Further, the cellular phone 12 is a cellular phone which is registered in advance by a user of the monitoring system 11. That is, when the monitoring system 11 judges that any abnormality occurs in the security region, the security system 1 gives notice of the abnormality to the cellular phone 12 that is previously registered by the user, through the external network 13. Accordingly, the user can be informed that the abnormality occurs in the security region. Hereinafter, a concrete description will be given.

[A-1: Monitoring System]

Figure 3:
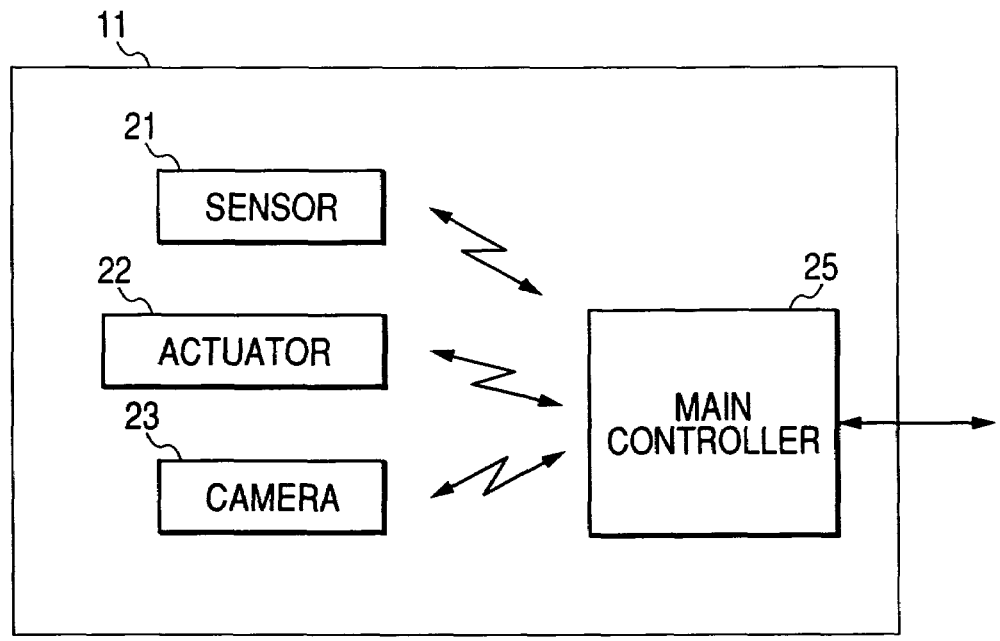
FIG. 3 is a block diagram showing an essential configuration of a monitoring system in accordance with an embodiment of the invention.

FIG. 3 is a block diagram showing a schematic configuration of the monitoring system 11 in the security system 1. As shown in FIG. 3, the monitoring system 11 has a sensor (information acquiring device or wireless communication apparatus) 21, a camera (information acquiring device, wireless communication apparatus or imaging device) 23, an actuator 22, and a main controller (monitoring control apparatus) 25.

(Sensor)

The sensor 21 detects an abnormal state such as trespass, and issues a warning. Specifically, the sensor 21 monitors the state of the security region and detects a change in state. Further, the sensor 21 detects the change in state, judges whether or not the abnormal state occurs, and when the abnormal state occurs, gives notice of the abnormality to the main controller 25. Moreover, abnormality is the general term for the abnormal states detected by the sensor, such as fire and trespass.

As the sensor 21, for example, a Doppler sensor, a vibration sensor, an MIR (Micro Impulse Radar) sensor, or the like can be used. However, a usable sensor is not limited to the above-described sensors, and any sensor can be used as long as it can identify the change in state of the security region. Besides, for example, a pyroelectric sensor, a lead switch or the like can be used. Further, according to the specification or the like of the security system 1, a number of sensors to be used, types of sensors, or the combination may be suitably changed.

The vibration sensor detects vibration or sound. The vibration sensor is provided at a door, for example, so as to detect vibration of the door or so as to detect sound or vibration when a lock is touched, for example, at the time of picking. Further, by providing the pyroelectric sensor or the lead switch, presence of a person or movement of an object can be detected. Further, when the lead switch or the MIR sensor is provided at the door or a window, opening and closing of the door or window is detected, or a breakage of a window glass or the like is detected. Moreover, the MIR sensor detects an object through reflection.

Figure 4:
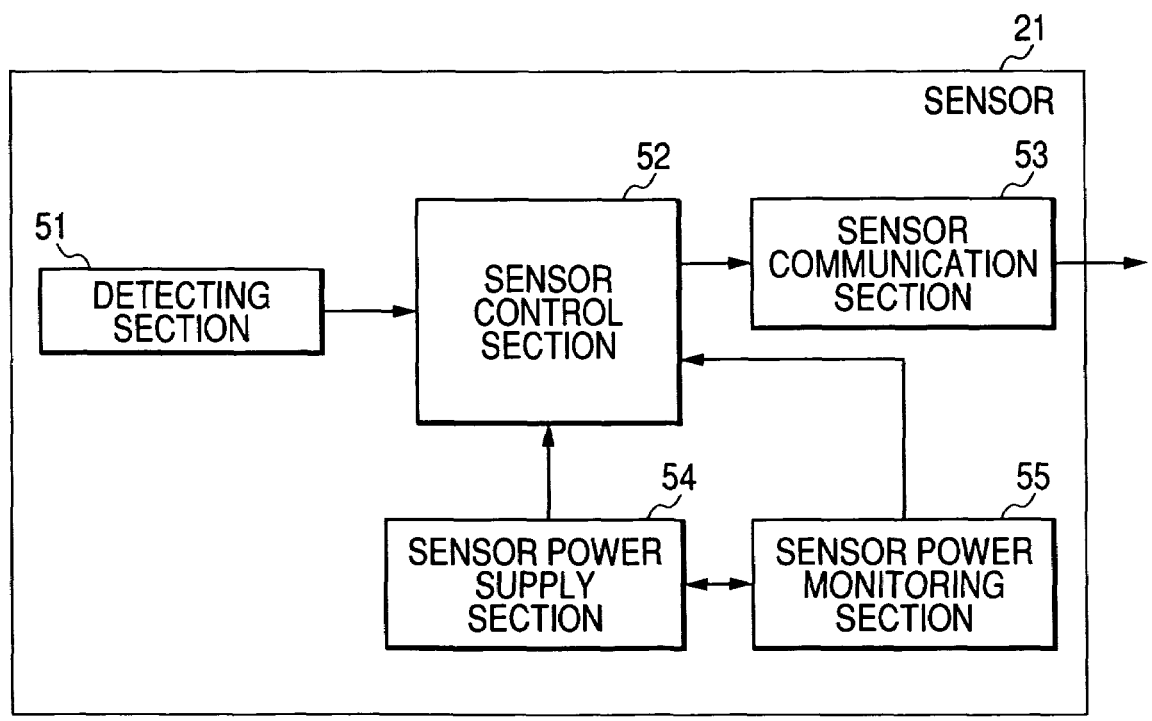
FIG. 4 is a block diagram showing an essential configuration of a sensor in accordance with an embodiment of the invention.

FIG. 4 is a block diagram showing a schematic configuration of the sensor 21. As shown in FIG. 4, the sensor 21 has a detecting section 51, a sensor control section 52, a sensor communication section 53, a sensor power supply section 54, and a sensor power monitoring section 55. Moreover, the individual sensors described above detect different objects but have the same configuration, and thus the same description can be applied.

The detecting section 51 detects information regarding the change (change information). The change information is information regarding a degree of change in the state detected by the detecting section 51 (a level of the change in state). The change information detected by the detecting section 51 is transmitted to the sensor control section 52.

The sensor control section 52 controls the entire sensor 21. For example, the sensor control section 52 gives notice of abnormality, or when a battery is used as the sensor power supply section 54, monitors a remaining battery level, and so on. Specifically, when receiving the change information detected by the detecting section 51, the sensor control section 52 judges whether or not the level of the change in state detected by the detecting section 51 is an abnormal level (abnormal state).

In the sensor control section 52, a threshold value for judging whether or not the change information detected by the detecting section 51 represents abnormality is stored in advance. Thus, the sensor control section 52 compares the change information transmitted from the detecting section 51 with the threshold value, and, when the change information exceeds the threshold value, judges that the abnormality occurs. When the sensor control section 52 judges that the abnormality occurs, the sensor control section 52 gives an abnormality notice to the main controller 25. The abnormality notice from the sensor control section 52 is performed through the sensor communication section 53.

The sensor communication section 53 is an interface through which the sensor 21 communicates with the main controller 25. The sensor 21 performs wireless communication with the main controller 25. In this embodiment, the sensor 21 performs wireless communication with the main controller 25 by using a specified low-power radio communication. For this reason, the sensor communication section 53 has an RFID (radio frequency identification) (wireless tag) for the specified low-power radio communication. The abnormality notice from the sensor control section 52 is transmitted from the sensor communication section 53 to the main controller 25.

Moreover, in this embodiment, the sensor 21 performs unidirectional communication with the main controller 25, that is, from the sensor 21 to the main controller 25. Alternatively, the sensor 21 may perform bidirectional communication with the main controller 25. However, in a case of the bidirectional communication, one device needs to be in a standby state so as to continuously receive a signal from the other device. For this reason, power consumption is increased. In contrast, in a case of the unidirectional communication like in this embodiment, the detecting section 51 just gives the abnormality notice to the main controller 25 when the abnormality is detected by the detecting section 51, and thus the power consumption can be reduced.

Further, the sensor power supply section 54 is a power supply for driving the individual parts of the sensor 21. The sensor power supply section 54 can be an AC power supply or a battery. However, since the sensor 21 is provided at the door or window, the battery is preferably used. In this case, the sensor 21 does not require a line for communication or a line for power, thereby realizing so-called full wireless. Moreover, as the battery, a primary battery, a secondary battery, a solar cell, or the like can be used.

When the battery is used as the sensor power supply section 54, there may be a case in which the battery is run down, and the sensor 21 stops. In order to prevent this problem, the remaining battery level needs to be monitored. For this reason, the sensor 21 has the sensor power monitoring section 55 that monitors the remaining battery level. The sensor power monitoring section 55 periodically monitors the remaining battery level, and transmits the monitoring result to the sensor control section 52. The sensor control section 52 judges on the basis of the monitoring result whether or not the remaining battery level is less than a predetermined value. When the sensor control section 52 judges that the remaining battery level is less than the predetermined value, the sensor communication section 53 transmits a remaining battery level lowering notice to the main controller.

In this embodiment, the "sensor 21" indicates not only one of the various sensors but also a plurality of the various sensors.

(Camera)

Figure 6:
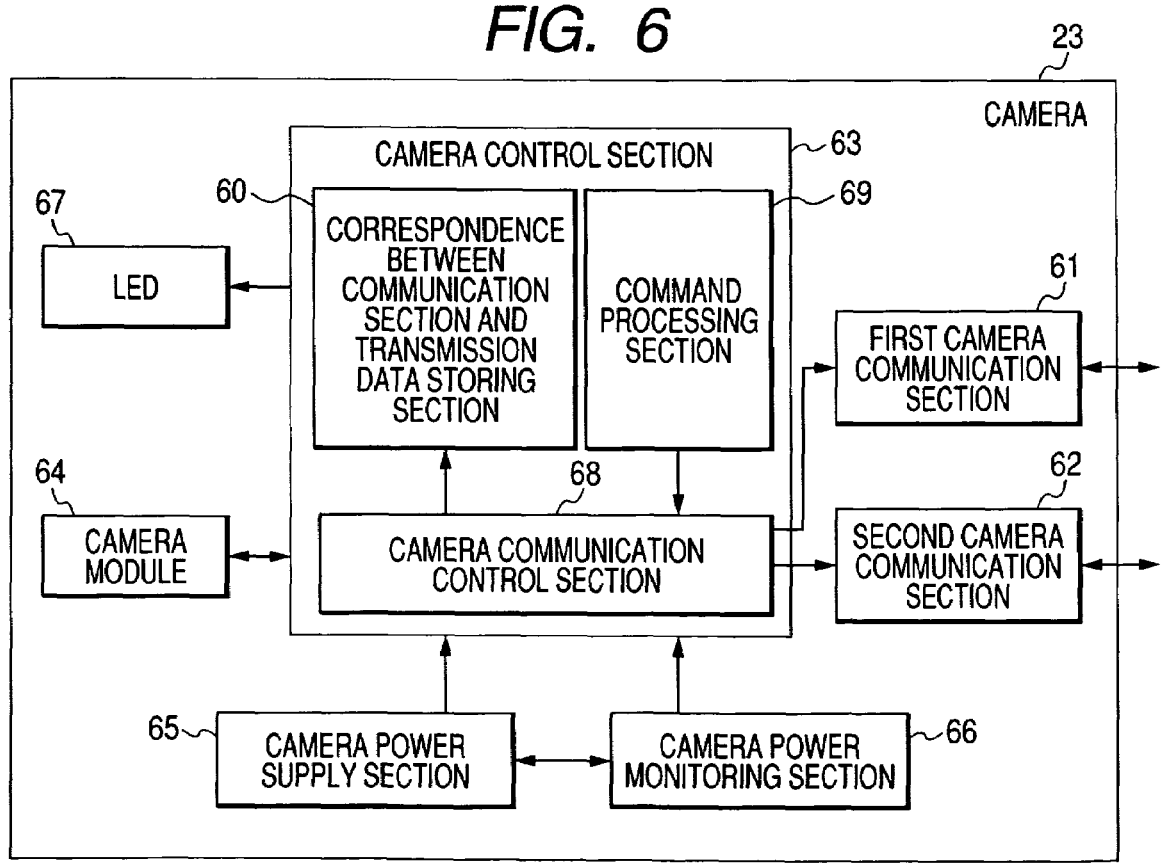
FIG. 6 is a block diagram showing an essential configuration of a camera in accordance with an embodiment of the invention.

The camera 23 images an image of the state of the security region. FIG. 6 is a block diagram a schematic configuration of the camera 23. As shown in FIG. 6, the camera 23 has a first camera communication section (communication section) 61, a second camera communication section (communication section) 62, a camera control section 63, a camera module (information acquiring section, or imaging section) 64, a camera power supply section 65, a camera power monitoring section 66, and an LED (light-emitting diode) 67.

The first camera communication section 61 and the second camera communication section 62 are interfaces through which the camera 23 communicates with the main controller 25. In this embodiment, the camera 23 performs wireless communication with the main controller 25. Further, the communication through the first camera communication section 61 and the communication through the second camera communication section 62 are performed by using different communication systems.

Specifically, for the wireless communication through the first camera communication section 61, the specified low-power radio communication is used. Further, for the wireless communication through the second camera communication section 62, a wireless communication based on IEEE802.11b standard (hereinafter, referred to as 'wireless LAN') is used. The specified low-power wireless communication system has low power consumption, and the wireless LAN communication system has high power consumption. Accordingly, different communication systems are employed so that the communication by the wireless LAN is suppressed to the minimum according to types of communication data.

However, a communication system to be used is not limited to the above-described communication systems. Any communication systems may be employed as long as a combination of the communication systems uses different communication speeds. When the specified low-power radio communication is used for the wireless communication through the first camera communication section 61, a wireless communication system based on IEEE 802.11 standard (for example, 802.11a, 802.11g, or the like), a wireless communication system based on IEEE 802.15 standard (for example, Bluetooth (Registered Trademark), UWB (Ultra Wide Band), ZigBee (Registered Trademark), or the like) can be used for the wireless communication through the second camera communication section 62.

The camera control section 63 controls the entire camera 23. For example, the camera control section 63 instructs the camera module 64 to take images, controls reception of the image data being taken, controls lighting of the LED 67 which will be described below, or monitors the remaining battery level.

As shown in FIG. 6, the camera control section 63 has a command processing section 69, a correspondence between communication section and transmission data storing section 60, and a camera communication control section 68.

The command processing section 69 performs a processing according to a control command received from the main controller 25 through the first camera communication section 61 or the second camera communication section 62, or a control command received from the camera power monitoring section 66.

Specifically, the command processing section 69 receives an image transfer request command, a wireless LAN setup command, or the like from the main controller 25 through the first camera communication section 61. Further, the command processing section 69 receives an imaging control command or the like from the main controller 25 through the second camera communication section 62. In addition, the command processing section 69 receives, from the camera power monitoring section 66, a remaining battery level judgment command including a battery voltage value, requesting a judgment on whether or not the remaining battery level is equal to or less than a predetermined threshold value.

When receiving the image transfer request command, the command processing section 69 operates the camera module 64, the LEDs, and the second camera communication section 62 only for predetermined time (for example, 30 seconds). Then, the command processing section 69 generates, as transmission data, response data for giving notice that the image transfer request command is received, and outputs the generated response data to the camera communication control section 68. Subsequently, the command processing section 69 generates, as transmission data, image data taken by the camera module 64, and outputs the image data to the camera communication control section 68.

Further, while the camera module 64 performs imaging, the command processing section 69 can receive the imaging control command. When receiving the imaging control command, the command processing section 69 controls the camera module 64 according to the imaging control command. For example, when the imaging control command represents an enlargement/reduction instruction, the command processing section 69 changes an imaging range of the camera module 64.

When receiving the wireless LAN setup command, the command processing section 69 performs a setup processing of communication conditions of the second camera communication section 62.

When receiving the remaining battery level judgment command, the command processing section 69 judges whether or not the battery voltage included in the remaining battery level judgment command is equal to or less than the predetermined threshold value. Then, when the battery voltage is equal to or less than the predetermined threshold value, the command processing section 69 generates, as transmission data, remaining battery level lowering notice data indicating that the remaining battery level is lowered, and outputs the generated data to the camera communication control section 68.

Moreover, the command processing section 69 makes data identification information which indicates content (type) of the transmission data be included in the generated transmission data. That is, the command processing section 69 adds, to the image data, the data identification information "IMAGE" indicating that the data is an image. Similarly, the command processing section 69 adds, to the response data to the image transfer request command, the data identification information "RESPONSE" indicating that the data is a response to the reception of the image transfer request command. Further, the command processing section 69 adds the data identification information "NOTICE" to the remaining battery level lowering notice data.

As such, the transmission data generated by the command processing section 69 is one of the data identification information "IMAGE", "RESPONSE" and "NOTICE". Here, the image data including the data identification information "IMAGE" has a relatively large data amount (for example, 10 Kbyte), and other types of the transmission data have a small data amount (for example, 10 byte).

Further, in this embodiment, it is assumed that the command processing section 69 performs the processing in a single task. Accordingly, the configuration of the command processing section 69 is simplified.

The correspondence between communication section and transmission data storing section 60 stores the data identification information (data identification information for second communication) indicating the content (type) of the transmission data to be transmitted by the second camera communication section 62. In this embodiment, the correspondence between communication section and transmission data storing section 60 only stores "IMAGE" as the data identification information for second communication.

Moreover, the data identification information for second communication stored in the correspondence between communication section and transmission data storing section 60 is set in advance.

In this embodiment, the camera module is driven only for the predetermined time (for example, 30 seconds) so as to take the images. For this reason, the data amount of the image data taken by the camera module is substantially constant (about 10 Kbyte). Then, as the data identification information for second communication, the data identification information corresponding to the image data which is the transmission data whose data amount is (is supposed to be) larger than the predetermined threshold value (for example, 1 Kbyte) is set in advance. That is, as the data identification information for second communication, the data identification information corresponding to the image data which is the transmission data whose usual time required to transmit at the communication speed of the specified low-power radio communication is (is supposed to be) longer than the predetermined time (for example, 20 seconds), is set in advance.

The camera communication control section 68 reads the data identification information from the transmission data received from the command processing section 69, and judges whether or not the read data identification information is stored in the correspondence between communication section and transmission data storing section 60. When the data identification information extracted from the transmission data is stored in the correspondence between communication section and transmission data storing section 60, the camera communication control section 68 transmits the transmission data by using the second camera communication section 62. On the other hand, when the data identification information extracted from the transmission data is not stored in the correspondence between communication section and transmission data storing section 60, the camera communication control section 68 transmits the transmission data by using the first camera communication section 61.

As such, the camera communication control section 68 controls switching between the communication systems from the camera 23 to the main controller 25. That is, the camera communication control section 68 has a function of switching (selecting) the communication using the specified low-power radio communication and the communication using the wireless LAN system according to the type of the data for communication. When the communication using the specified low-power radio communication is performed, the camera communication control section 68 controls such that the communication is performed through the first camera communication section 61. On the other hand, when the communication using the wireless LAN system is performed, the camera communication control section 68 controls such that the communication is performed through the second camera communication section 62.

In this embodiment, normally, the communication is performed through the first camera communication section 61. Then, at the step of transmitting the image data during a series of operations for taking the images, the communication is performed through the second camera communication section 62 by switching from the first camera communication section 61 to the second camera communication section 62.

That is, the camera communication control section 68 selects the second camera communication section 62, not the first camera communication section 61, at the step of transmitting the image data during the series of operations for taking the images.

The camera module 64 images a predetermined image on the basis of the instruction of the camera control section 63. The camera module 64 has an imaging device, such as a CCD (charge-coupled device) or the like. For example, when the abnormality occurs, the camera module 64 takes an image of the abnormal state or takes an image by an instruction of a user. Further, the camera module 64 preferably has a pan/tilt function. In this case, a space including a certain range can be imaged, and a fixed-point image is not taken.

Further, the image taken by the camera module 64 may be a still picture or a motion picture. Image data taken by the camera module 64 is transmitted to the camera control section 63. Then, through the control of the camera control section 63, the image data is transmitted to the main controller 25 through the second camera communication section 62.

The camera power supply section 65 is a power supply for driving the individual parts of the camera 23. As the camera power supply section 65, a battery or an AC power supply can be used. When a battery is used as the camera power supply section 65, since the camera 23 does not require a line for communication or a line for power, an installing position of the camera 23 has no limitation. Moreover, as the battery, a primary battery or a secondary battery can be used.

Further, the camera power monitoring section 66 monitors the remaining battery level used as a power supply. The monitoring result (for example, a battery voltage) by the camera power monitoring section 66 is transmitted to the camera control section 63. The camera control section 63 judges whether or not the remaining battery level is less than a predetermined value. When it is judged that the remaining battery level is less than the predetermined value (for example, less than a predetermined voltage), the camera control section 63 gives the remaining battery level lowering notice to the main controller 25.

The camera power supply section 65 is not limited the use of the battery. For example, an AC power supply can also be used. In this case, the camera power monitoring section 66 for monitoring the remaining battery level does not need to be provided. Further, when the AC power supply is used, a motion picture which requires high power consumption can be easily taken and image data of the motion picture can be easily transmitted.

The LED 67 is a light for illumination. The LED 67 is turned on when brightness at a place where the camera is installed is insufficient at the time of imaging. The LED 67 can be manually or automatically turned on. When the LED 67 is manually turned on, a user can access the main controller 25 through the cellular phone 12 so as to turn on the LED 67. Further, when the LED 67 is automatically turned on, for example, the camera control section 63 may judge whether or not brightness at the place where the camera is installed is enough for the imaging. When it is judged that brightness at the place where the camera is installed is enough for the imaging, the LED 67 may be turned on.

As described above, the communication between the camera 23 and the main controller 25 is performed by the wireless communication through the first camera communication section 61 and the second camera communication section 62. Further, for the communication between the first camera communication section 61 and the main controller 25, the specified low-power radio communication is used. For the communication between the second camera communication section 62 and the main controller 25, the wireless LAN system is used. The details regarding the communication between the camera 23 and the main controller 25 will be described below.

(Actuator)

Figure 5:
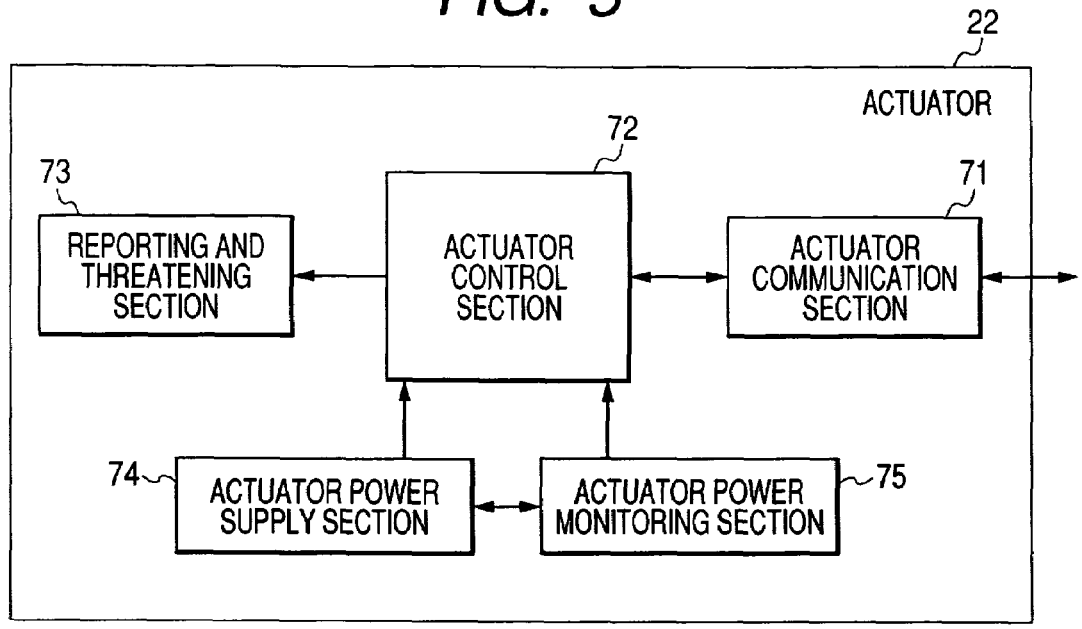
FIG. 5 is a block diagram showing an essential configuration of an actuator in accordance with an embodiment of the invention.

When the abnormality occurs, the actuator 22 warns about the abnormality toward the outside or threatens a suspected person or the like. The actuator 22 is connected to the main controller 25 for communication, and reports the abnormality or threatens the suspected person or the like on the basis of an instruction from the main controller 25. FIG. 5 is a block diagram showing a schematic configuration of the actuator 22. As shown in FIG. 5, the actuator 22 has an actuator communication section 71, an actuator control section 72, a reporting and threatening section 73, an actuator power supply section 74, and an actuator power monitoring section 75.

The actuator communication section 71 is an interface through which the actuator 22 communicates with the main controller 25. The actuator 22 may perform wire or wireless communication with the main controller 25. However, wireless communication is preferably used so that a place where the actuator 22 is installed is not limited. In this embodiment, as a wireless communication system, the specified low-power radio communication is used.

When the abnormality occurs, the actuator communication section 71 receives a signal (abnormality signal) regarding the occurrence of the abnormality transmitted from the main controller 25. The abnormality signal received by the actuator communication section 71 is transmitted to the actuator control section 72.

The actuator control section 72 controls the entire actuator 22. That is, the actuator control section 72 controls the actuator communication section 71 so as to communicate with the main controller 25. Further, when receiving the abnormality signal from the main controller 25, the actuator control section 72 activates the reporting and threatening section 73 according to that signal.

The reporting and threatening section 73 reports the abnormality to the outside by "sound" or "light", and threatens a trespasser or the like. As the reporting and threatening section 73, specifically, a bell, a buzzer, a siren, an illumination, or the like can be used.

Moreover, any actuator 22 may be used as long as the actuator 22 can receive the abnormality signal from the main controller 25. The actuator 22 may perform unidirectional communication or bidirectional communication with the main controller 25. However, when a battery is used as a power supply for driving the actuator 22, data regarding the remaining battery level needs to be transmitted from the actuator 22 to the main controller 25. In this case, therefore, bidirectional communication is preferably used.

Moreover, as the actuator power supply section 74 for driving the actuator 22, an AC power supply or a battery can be used. Preferably, the battery is used. In this case, the actuator 22 does not require a line for communication or a line for power, thereby realizing so-called full wireless. Moreover, as the battery, a primary battery, a secondary battery, a solar cell, or the like can be used.

Further, when the battery is used as the actuator power supply section 74, the actuator power monitoring section 75 that monitors the remaining battery level is preferably provided. The actuator power monitoring section 75 periodically monitors the remaining battery level, and transmits the monitoring result to the actuator control section 72. The actuator control section 72 judges on the basis of the monitoring result whether or not the remaining battery level is less than a predetermined value. When it is judged by the actuator control section 72 that the remaining battery level is less than the predetermined value, the actuator 22 transmits a remaining battery level lowering notice to the main controller 25 through the actuator communication section 71.

(Main Controller)

Figure 1:
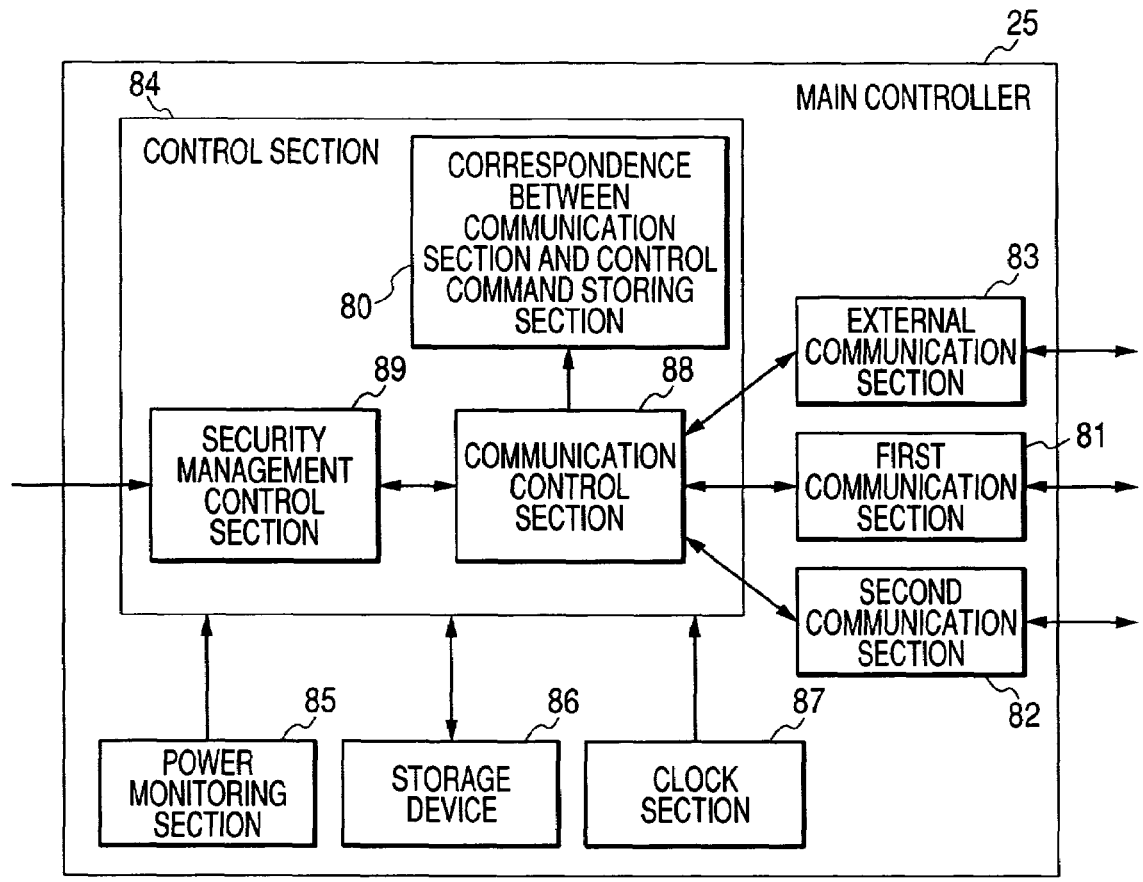
FIG. 1 is a block diagram showing an essential configuration of a main controller in accordance with an embodiment of the invention.

The main controller 25 controls the sensor 21, the camera 23, and the actuator 22 so as to control the entire monitoring system 11. FIG. 1 is a block diagram showing a schematic configuration of the main controller 25.

As shown in FIG. 1, the main controller 25 has a first communication section (communication section) 81, a second communication section (communication section) 82, an external communication section 83, a control section 84, a power monitoring section 85, a storage device 86, and a clock section 87.

The first communication section 81 and the second communication section 82 are interfaces through which the main controller 25 communicates with the sensor 21, the camera 23, and the actuator 22. That is, the main controller 25 communicates with the sensor 21, the camera 23, and the actuator 22 through the first communication section 81 and the second communication section 82.

Further, for the communication through the first communication section 81 and the communication through the second communication section 82, different communication systems are adopted. Specifically, for the communication through the first communication section 81, the specified low-power radio communication is used, and, for the communication through the second communication section 82, the wireless LAN system is used.

The external communication section 83 is an interface through which the main controller 25 communicates with the external network 13. The main controller 25 is connected to Internet (Registered Trademark) through the external communication section 83. That is, the monitoring system 11 is connected to the external network 13 through Internet (Registered Trademark).

As such, the main controller 25 is connected to the sensor 21, the camera 23, and the actuator 22 for communication, and also is connected to the external network 13 for communication.

The control section 84 controls the entire main controller 25. The control section 84 has a communication control section (transfer request sending section, and specific data receiving section) 88, a security management control section (transfer request sending section, and second communication section activating section) 89, and a correspondence between communication between communication section and control command storing section 80.

The security management control section 89 performs controls so as to perform various kinds of setups including the setup of the alert states of the security system 1, or give notice of abnormality to the user on the basis of the data transmitted from the sensor 21 or the camera 23.

The security management control section 89 generates control commands for controlling the sensor 21, the camera 23, and the actuator 22. A control command generating section outputs the generated control commands to the communication control section 88.

Specifically, the security management control section 89 generates the control commands according to the instructions received from the external communication section. As the control commands generated by the control command generating section, the image transfer request command to the camera 23, the imaging control command to the camera 23, the wireless LAN setup command to the camera 23, the switching command of turning on/off of the function to the sensor 21, a threatening start instruction to the actuator, and the like are included.

Moreover, the security management control section 89 adds command identification information indicating the types of control commands to the generated control commands.

The correspondence between communication between communication section and control command storing section 80 stores the command identification information (command identification information for second communication) for identifying the types of control commands to be transmitted by using the second communication section 82. In this embodiment, the correspondence between communication between communication section and control command storing section 80 only stores "IMAGING CONTROL" as the command identification information for second communication.

The communication control section 88 controls the first communication section 81, the second communication section 82, and the external communication section 83. That is, the communication control section 88 controls the communication with the sensor 21, the camera 23, the actuator 22, and the external network 13.

The communication control section 88 performs a switching control of a communication system of a communication from the main controller 25 to the camera 23 or the sensor 21. That is, the communication control section 88 has a function of switching (selecting) the specified low-power wireless communication and the wireless LAN communication according to the types of communication data. In a case of the specified low-power wireless communication, the communication control section 88 performs the control such that the communication is performed through the first communication section 81. On the other hand, in a case of the wireless LAN communication, the communication control section 88 controls such that the communication through the second communication section 82 is performed.

Specifically, when receiving the control command from the security management control section 89, the communication control section 88 extracts the command identification information from the control command, and judges whether or not the extracted command identification information is stored in the correspondence between communication between communication section and control command storing section 80 as the command identification information for second communication. When the command identification information extracted from the control command is stored in the communication section-control command 80, the communication control section 88 transmits the control command by using the second communication section 82. On the other hand, when the command identification information extracted from the control command is not stored in the communication section-control command 80, the communication control section 88 transmits the control command by using the first communication section 81.

Further, the communication control section 88 transmits data for terminal received from the camera 23 or the sensor 21 through the first communication section 81 or the second communication section 82 to the cellular phone 12 previously registered by using the external communication section. For example, the communication control section 88 transmits the image data received from the camera 23 or the notice of abnormality received from the sensor 21 to the cellular phone 12.

As such, in this embodiment, normally, the communication is performed through the first communication section 81. Then, at the step of receiving the image data, the communication is performed through the second communication section 82 by switching from the first communication section 81 to the second communication section 82.

The power monitoring section 85 monitors a power supply for driving the main controller 25. As the power supply for driving the main controller 25, a primary battery, a secondary battery, a solar cell, or an AC power supply may be used. When the power supply of the main controller 25 is the primary battery or the secondary battery, the main controller 25 has the power monitoring section 85. That is, when the power supply of the main controller 25 is not a power supply that requires replacement (permanent power supply), such as the AC power supply or the solar cell, the power monitoring section 85 monitors the remaining battery level.

In this case, the monitoring result by the power monitoring section 85 is transmitted to the control section 84, and the control section 84 judges whether or not the remaining battery level is less than a predetermined value. As a result of the judgment, when the remaining battery level is less then the predetermined value, the main controller 25 transmits a mail indicating that the remaining battery level is less than the predetermined value, to the cellular phone 12 of the user through the external network 83.

Further, the power monitoring section 85 may have a function of detecting that the power is cutoff, regardless of the power supply that is used, such as the battery or the AC power supply. In this case, when the power is cutoff due to any causes, the power monitoring section 85 can detect that power is cutoff. Then, the main controller 25 may transmit a mail indicating that the power is cutoff to the cellular phone 12 of the user. Accordingly, for example, the user can be informed of an alert interruption by an unexpected situation, such as intentional power cutoff by a trespasser or a blackout.

Further, when the power is cutoff, the main controller 25 may store the fact that the power is cutoff in the storage device 86. In addition, the main controller 25 may also store a cutoff time on the basis of time information of the clock section 87. The clock section 87 has a clock function, and a time setup can be manually or automatically performed. For the automatic time setup, for example, time information can be acquired from a clock-dedicated server on the network. Further, when data is received, time information attached to the data can be acquired. For the manual time setup, an access to the main controller 25 from the cellular phone 12 can be performed, and then the setup of the clock function can be changed.

Moreover, in the storage device 86, in addition to the information regarding the power cutoff, a history of the abnormality that is occurred or the image data taken by the camera 23 may be stored. Further, a setup for driving the actuator 22 may be stored. In this case, the main controller 25 drives the actuator 22 on the basis of the setup.

Further, a plurality of LEDs having different colors may be provided in the main controller 25, and the LEDs maybe changed so as to be turned on according to a plurality of alert states of the security system 1. Accordingly, it can be simply judged whether or not the security system 1 is in the alert state at that point. For example, by turning on a red LED when the security system 1 is in an away mode, by turning on a green LED when the security system 1 is in a home mode, and by turning off the LEDs when the security system 1 is in a non-alert mode, the judgment can be easily performed.

(Communication between Camera and Main Controller)

As described above, for the communication between the camera 23 and the main controller 25, the specified low-power radio communication and the wireless LAN system are used. In this embodiment, the first communication section 81 and the first camera communication section 61 communicate with each other by using the specified low-power radio communication. Further, the second communication section 82 and the second camera communication section 62 communicate with each other by using the wireless LAN system. The communication between the first communication section 81 and the first camera communication section 61 and the communication between the second communication section 82 and the second camera communication section 62 are bidirectional communication.

Here, data transmitted from the first communication section 81 to the first camera communication section 61 is data regarding the setup of the wireless LAN system, an activation instruction of the camera 23, or an imaging instruction to the camera 23, and so on. On the other hand, data transmitted from the first camera communication section 61 to the first communication section 81 is a registration command for registering the camera 23 in the main controller 25, and so on.

Moreover, the data regarding the setup of the wireless LAN system is setup data to be registered for establishing the communication between the main controller 25 and the camera 23 by the wireless LAN system (the communication between the second communication section 82 and the second camera communication section 62 by the wireless LAN system). Such data includes, for example, data for setting addresses.

On the other hand, the image data taken by the camera 23 is transmitted from the second camera communication section 62 to the second communication section 82. Further, as for the communication between the second communication section 82 and the second camera communication section 62, a communication (PING) is performed so as to mutually confirm whether or not the setup of the wireless LAN system is normally performed.

Moreover, in a normal state, the camera drives only the first camera communication section 61 and the camera control section 63. Other parts are not driven, that is, other parts are in a so-called sleep state. In this state, the first camera communication section 61 (that is, a part which performs the communication by using the specified low-power radio communication) awaits the activation instruction (imaging instruction) transmitted from the main controller 25. That is, the first camera communication section 61 is in a standby state.

When receiving the activation instruction (imaging instruction) from the main controller 25, the first camera communication section 61 activates the individual parts by the camera control section 63. Then, images are taken under the imaging instruction, and the camera control section 63 transmits the image data to the main controller 25 through the second camera communication section 62 (by using the wireless LAN system).

Hereinafter, a flow of the processing regarding the communication between the camera 23 and the main controller 25 will be described by way of a processing at the camera 23 and a processing at the main controller 25.

<Flow of Processing in Camera>

Figure 14:
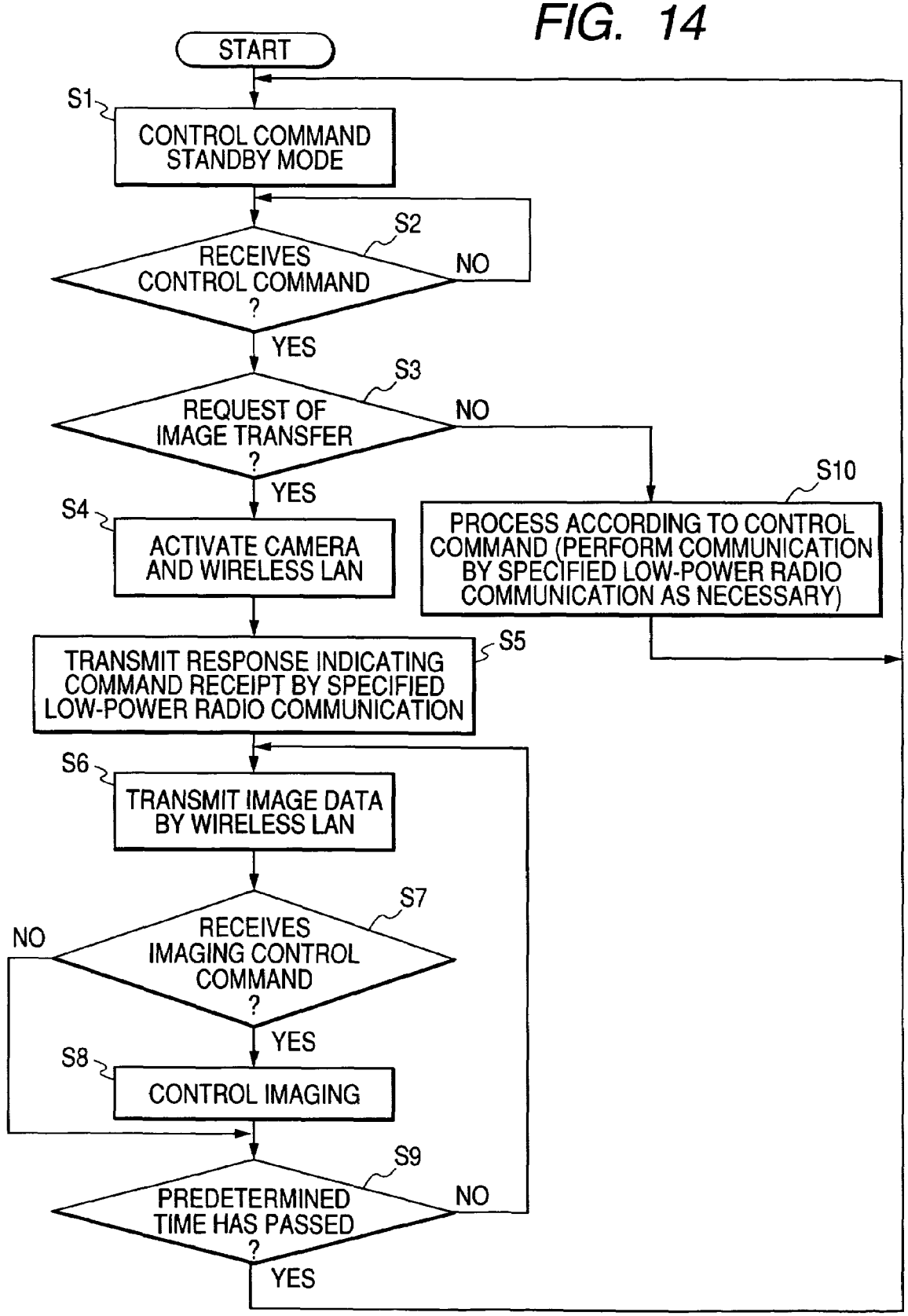
FIG. 14 is a flowchart showing a flow of internal processing of a camera with respect to a communication with a main controller.

FIG. 14 is a flowchart showing the flow of the processing in the camera 23. In the camera 23, the camera control section 63, the first camera communication section 61, and the camera power monitoring section 66 are driven, while other members are not driven. In this state, the camera control section 63 waits for the reception of the control command from the first camera communication section 61 (here, the image transfer request command or the wireless LAN setup command) or the control command from the camera power monitoring section 66 (here, the remaining battery level judgment command), and the camera control section 63 is in a standby state (Step S1).

Next, the command processing section 69 of the camera control section 63 judges whether the control command from the first camera communication section 61 (here, the image transfer request command or the wireless LAN setup command) or the control command from the camera power monitoring section 66 (here, the remaining battery level judgment command) is received (Step S2). When the control command is not received (No at the step S2), the step S2 is repeated again.

On the other hand, if the control command is received (Yes at the step S2), the command processing section 69 analyzes the received control command, and judges whether or not the received control command is the image transfer request command (Step S3).

If the image transfer request command is received (Yes at the step S3), the command processing section 69 activates the camera module 64, the LEDs, and the second camera communication section 62 (Step S4). Accordingly, the camera module 64 starts to take the images, and the wireless LAN communication between the second camera communication section 62 and the main controller 25 is established.

Next, the command processing section 69 generates response data indicating that the image transfer request command is received, and outputs the response data to the camera communication control section 68. At this time, the command processing section 69 adds the data identification information indicating the type of data (here, information "RESPONSE" indicating the response to the image transfer request command) to the response data. Then, the camera communication control section 68 extracts the data identification information from the response data received from the command processing section 69, and judges whether or not the extracted data identification information "RESPONSE" is stored in the correspondence between communication section and transmission data storing section 60. In this embodiment, since the data identification information "RESPONSE" is not stored in the correspondence between communication section and transmission data storing section 60, the camera communication control section 68 transmits the response data by using the first camera communication section 61 (Step S5).

Next, the command processing section 69 outputs the image data taken by the camera module 64 activated at the step S4 to the camera communication control section 68. At this time, the command processing section 69 adds the data identification information indicating the type of data (here, information "IMAGE" indicating that the data is an image) to the image data. Then, the camera communication control section 68 extracts the data identification information from the image data received from the command processing section 69, and recognizes that the data identification information "IMAGE" is stored in the correspondence between communication section and transmission data storing section 60. For this reason, the camera communication control section 68 transmits the image data by using the second camera communication section 62 (Step S6). By doing so, the camera communication control section 68 continues to transmit the image data taken by the camera module 64 by using the second camera communication section 62.

Next, the command processing section 69 judges whether or not the second camera communication section 62 receives the imaging control command (Step S7). If the imaging control command is received (Yes at the step S7), the command processing section 69 performs a processing according to the imaging control command (Step S8). For example, the command processing section 69 controls a focal distance of the camera module 64 so as to enlarge/reduce the imaging range. Then, the process moves to a step S9. Further, if the imaging control command is not received, the process also progresses to the step S9.

Next, the command processing section 69 judges whether or not a predetermined time (for example, 30 seconds) passes after the camera module 64, the LEDs, and the second camera communication section 62 are activated (Step S9). Moreover, the command processing section 69 has a timer (not shown), and measures time lapsed by using the timer. If the predetermined time does not lapse after the activation (No at the step S9), the process returns to the step S6, and a transmission processing of the image data is continuously performed. On the other hand, if the predetermined time lapses (Yes at the step S9), the command processing section 69 stops the camera module 64, the LEDs, and the second camera communication section 62. Then, the process returns to the step S1.

Further, at the step S3, if the received control command is not the image transfer request command, the command processing section 69 performs a processing according to the received control command (Step S10). At this time, if necessary, the command processing section 69 performs the communication using the first camera communication section 61.

Specifically, if the received control command is the wireless LAN setup command, the command processing section 69 updates the setup information for the second camera communication section 62.

Further, if the received control command is the remaining battery level judgment command, the command processing section 69 generates, as transmission data, the remaining battery level lowering notice data indicating that the remaining battery level is lowered, and outputs that data to the camera communication control section 68. At this time, the command processing section 69 adds the data identification information "NOTICE" to that data. Then, in this embodiment, since the data identification information "NOTICE" is not stored in the correspondence between communication section and transmission data storing section 60, the camera communication control section 68 transmits the remaining battery level lowering notice data to the first camera communication section 61.

<Flow of Processing in Main Controller>

Figure 15:
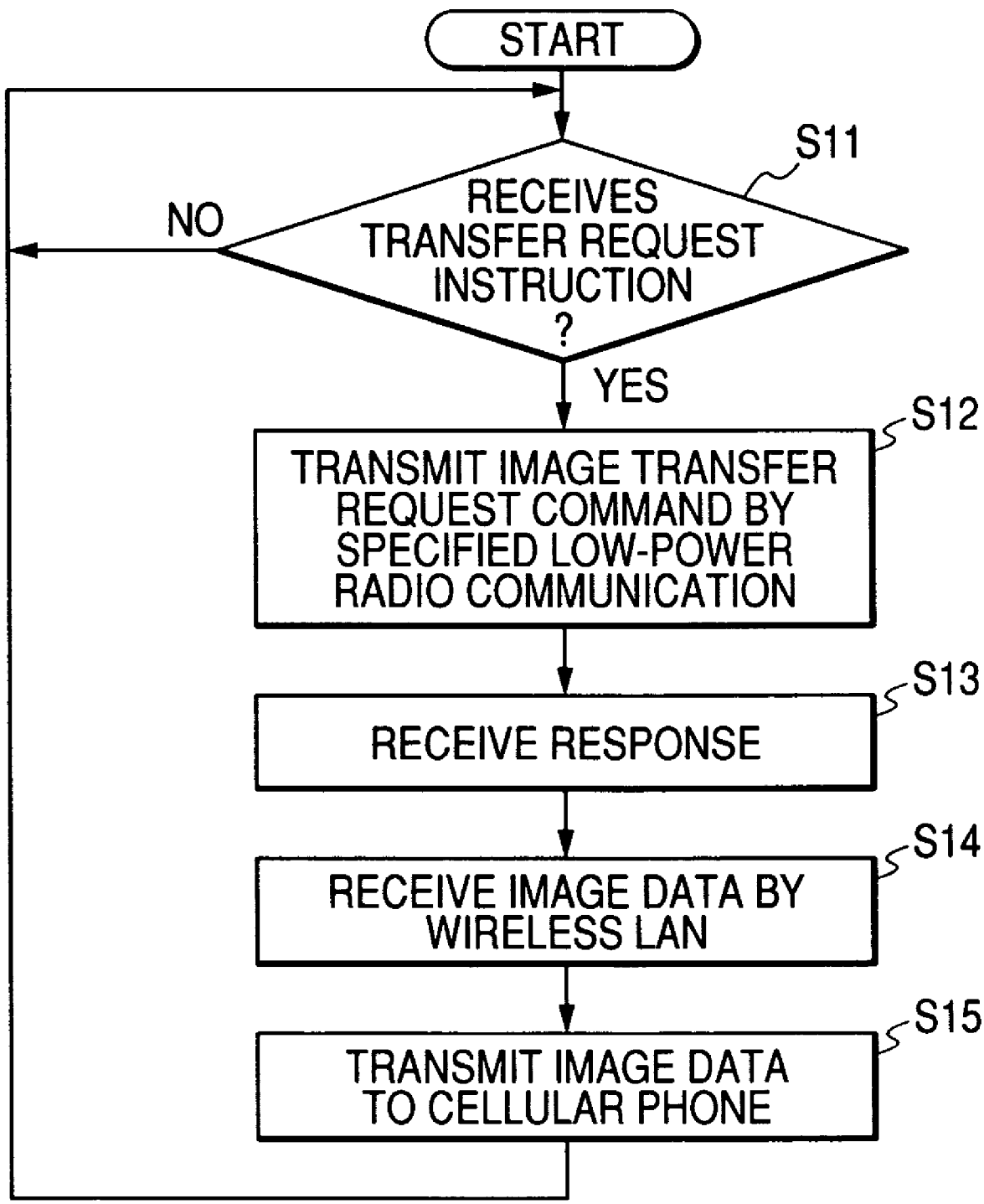
FIG. 15 is a flowchart showing a flow of internal processing of a main controller with respect to a communication with a camera.

Next, the flow of the processing in the main controller 25 regarding the communication with the camera 23 will be described with reference to a flowchart of FIG. 15.

First, the security management control section 89 judges whether or not the external communication section receives the transfer request instruction of the current image from the cellular phone 12 (Step S11). To the transfer request instruction of the current image, camera identification information for identifying the camera 23 is added. Moreover, when the cellular phone 12 receives the notice of abnormality detected by the sensor 21, the user primarily input the transfer request instruction of the image of the camera 23 to the cellular phone 12, and transmits the transfer request instruction to the main controller 25. Alternatively, in order to confirm the image of the camera 23, the user may input the transfer request instruction of the image of the camera 23 to the cellular phone 12, and may transmit the transfer request instruction to the main controller 25.

When the external communication section receives the transfer request instruction of the current image, the security management control section 89 generates the image transfer request command to the camera 23 to be identified by the camera identification in formation added to the received transfer request instruction, and outputs the generated image transfer request command to the communication control section 88. At this time, the security management control section 89 adds the command identification information "TRANSFER REQUEST" indicating the type of command to the image transfer request command.

The communication control section 88 extracts the command identification information from the image transfer request command received from the security management control section 89, and judges whether or not the command identification information "TRANSFER REQUEST" is stored in the correspondence between communication between communication section and control command storing section 80. In this embodiment, since the command identification information "TRANSFER REQUEST" is not stored in the correspondence between communication between communication section and control command storing section 80, the communication control section 88 transmits the image transfer request command by using the first communication section 81 (Step S12).

Next, the security management control section 89 confirms that the response data to the image transfer request command is received by the first communication section 81 (Step S13). Then, the second communication section 82 receives the image data (Step S14).

Next, the communication control section 88 transmits the image data received by the second communication section 82 to the cellular phone 12, which is the transmission source of the transfer request instruction received at the step S11, through the external communication section (Step S15). Then, the process returns to the step S11.

As such, in the camera 23, the camera communication control section 68 switches the specified low-power radio communication by the first camera communication section 61 and the wireless LAN system by the second camera communication section 62. Specifically, the camera communication control section 68 transmits the transmission data including the data identification information for second communication stored in the correspondence between communication section and transmission data storing section 60 by the wireless LAN system, and transmits other types of the transmission data by the specified low-power radio communication. Further, in the main controller 25, the communication control section 88 transmits the image transfer request command through the specified low-power radio communication, and receives the image data requested by the command through the wireless LAN system.

Here, in the correspondence between communication section and transmission data storing section 60, the data identification information corresponding to the transmission data whose data amount is previously supposed to be equal to or larger than the predetermined threshold value (that is, transmission data whose time required to transmit at the communication speed of the specified low-power radio communication is supposed to be more than the predetermined time) is stored. In this embodiment, the data identification information "IMAGE" corresponding to the image data is stored.

Accordingly, the camera communication control section 68 can transmit transmission data having the large data amount (here, image data) through the wireless LAN system having the higher communication speed than that of the specified low-power radio communication. Further, only when receiving the image transfer request command, the camera communication control section 68 activates the second camera communication section 62. For this reason, the standby state is constantly maintained, and thus driving time of the wireless LAN system having high power consumption can be suppressed to the minimum. As a result, image data having the large data amount can be efficiently transmitted in short time, and an increase in power consumption can be suppressed to the minimum.

Moreover, the wireless communication by the specified low-power radio communication has come into wide use as a wireless communication system among various types of general-use sensors. For this reason, the configuration of the system is simple, and the installment or setup of the system can be easily performed. Further, the wireless communication by the specified low-power radio communication has advantages such as fast establishment of communication among the individual terminals and long communication range, as compared with the wireless communication by the wireless LAN system. In addition, the wireless communication by the specified low-power radio communication can be unidirectional or bidirectional, and can establish communication only when data transmission and reception is performed. Therefore, power consumption can be reduced.

On the other hand, the wireless communication by the wireless LAN system has come into wide use as a wireless communication system among general-use personal computers. For this example, the configuration of the system is simple and the cost is low. Further, the wireless communication by the wireless LAN system has an advantage such as fast communication speed, as compared with the wireless communication by the specified low-power radio communication. For this reason, the wireless communication by the wireless LAN system can be suitably used at the time of transmission and reception of data having large data amount. However, based on the standards, unidirectional communication cannot be performed, and a standby state needs to be continuously maintained for communication, which causes high power consumption.

As such, by using different communication systems of the wireless communication such as the specified low-power radio communication and the wireless communication by the wireless LAN system, the communication system to be used can be changed so as to utilize the advantages of the specified low-power radio communication and the wireless LAN system according to the transmitted data. In the above description, the transmission data that is assumed to have a data amount equal to or larger than a predetermined threshold value (that is, the transmission data that is assumed to require time larger than a predetermined threshold value, to be sent by the communication speed of the specified low-power radio communication) is sent by the wireless LAN system, and data other than the above transmission data is sent by the specified low-power radio communication.

As a result, the life of the battery used in the camera power supply section 65 can be extended. For example, the wireless communication by the wireless LAN system is used only for transmission and reception of the image data, and the specified low-power radio communication is used for data transmission and reception, such as data representing the setup function of the wireless LAN system, or the camera activation signal. Therefore, the use of the wireless LAN system which requires high power consumption can be suppressed to the minimum. As a result, a battery can be used for the camera power supply section 65, and thus the camera 23 can be wireless.

Moreover, in this embodiment, the camera 23 has the first camera communication section 61 and the second camera communication section 62, and data transmission and reception is performed by switching the specified low-power radio communication and the wireless LAN system. However, the invention is not limited to this embodiment. For example, when an AC power supply is used as the camera power supply section 65 of the camera 23, the camera 23 can be continuously activated. In this case, the transmission and reception of data to be required can be performed by using only the wireless LAN system, without using the specified low-power radio communication.

[A-2: External Network]

The monitoring system 11 is connected to the cellular phone 12 through the external network 13 for communication. The external network 13 is so-called Internet. However, in the invention, the monitoring system 11 and the cellular phone 12 communicate with each other through a protocol converting device while passing through Internet.

The protocol converting device realizes bidirectional communication between the monitoring system 11 and the cellular phone 12. Here, the cellular phone 12 performs data communication using HTTP (HyperText Transfer Protocol), but the monitoring system 11 is connected to the Internet through a router. Accordingly, the cellular phone 12 cannot perform direct communication with the monitoring system 11. For this reason, the conversion into a predetermined protocol is performed through the protocol converting device.

The protocol converting device has a VPN (Virtual Private Network) and a proxy server. The VPN is a network technology in which, even though the communication passes through the Internet, base stations are connected to one another as a leased line, thereby performing a safety communication. The VPN is called a virtual private network or a virtual network. The proxy server is a device for converting addresses (converting protocols).

That is, any protocol converting device can be used as long as it can pass through a barrier (for example, a router or the like), and can perform directional communication between the monitoring system 11 and the cellular phone 12.

By performing the communication through the VPN having the proxy server, the direct connection to the monitoring system under an NAT (network address translation) can be made by a tunneling connection and a VPN private IP, thereby enabling so called "NAT pass". Accordingly, transmission and reception of a mail can be performed between the monitoring system 11 and the cellular phone 12.

In case of the communication using the VPN, the communication is performed by using an encrypted packet. For example, the communication between the monitoring system and the cellular phone is encrypted by SSL (secure sockets layer). Accordingly, a safety communication can be established. Further, an undesirable access for management can be immediately shut down.

In addition, for example, by assigning a global IP as the IP of the VPN, the direct connection can be made from a terminal on a general-use network, which is not connected to the VPN network.

[A-3: Cellular Phone]

The cellular phone 12 communicates with a base station, which is connected to the external network 13 through a cable or the like, by transmitting and receiving electrical waves to and from the base station. That is, the cellular phone 12 is connected to the external network 13 through the base station, and then is connected to the monitoring system 11 for communication. Moreover, as the cellular phone 12 used in the security system 1 according to the invention, any cellular phone 12 can be used as long as it has a mail transmission and reception function.

[B: Setup and Registration of Security System]

Next, the setup and registration of the security system 1 will be described with reference to FIGS. 7 to 13. FIGS. 7 to 13 are block diagrams each showing a flow (data transmission and reception) when various kinds of setups and registration of the security system 1 are performed.

When the security system 1 starts, an initial setup of the main controller 25 is performed. As shown in FIG. 7, the initial setup is performed by using the cellular phone 12. First, an access is made to an address written in a manual which is attached to the purchased security system 1 (SETUP (1)). Then, a screen for inputting an ID and a password written in the manual is displayed on the cellular phone 12. Next, a login is made by inputting the ID and the password written in the manual (SETUP (2)). Accordingly, a screen for registering a new password and a new mail address is displayed on the cellular phone 12.

On this screen, when the new password and the new mail address are input and a setup button is pressed, data regarding the password and the mail address is transmitted to the main controller 25, and the password and the mail address are registered (SETUP (3)). Accordingly, the initial setup of the main controller 25 is completed. Further, when the initial setup of the main controller 25 is completed, a notice indicating that the initial setup is completed is given from the main controller 25 to the cellular phone 12 (NOTICE (4)). Moreover, when an error occurs at the time of the input of the ID or the password, the error may be displayed, and a menu for selecting a screen to reenter may be displayed.

Next, the registration is performed so as to make the main controller 25 recognize the individual sensors 21 or the camera 23. In each of the sensors 21, the camera 23, and the main controller 25, a registration button is provided, and the registration is performed by using the registration button.

Specifically, when the registration button of the main controller 25 of which initial setup is completed is pressed, the main controller 25 stays in a registration mode for a predetermined time (for example, 30 seconds). On the other hand, when the registration button provided in the camera 23 or the sensor 21 is pressed, a registration command is transmitted from the camera 23 or the sensor 21 of which registration button is pressed.

Here, the registration of the sensor 21 will be described with reference to FIG. 8. First, after the initial setup of the main controller 25 is performed, the main controller 25 is set to be in a registration mode state (SETUP (5)). Then, while the main controller 25 is in the registration mode state, the registration button of the sensor 21 is pressed. Next, a registration command regarding the sensor 21 of which registration button is pressed is transmitted to the main controller 25 (REGISTRATION (6)). When receiving the registration command during the registration mode state, the main controller 25 registers the corresponding sensor 21. Then, when the sensor 21 is registered, the main controller 25 transmits data representing the registration to the cellular phone 12. For a notice to the user, the cellular phone 12 displays a content indicating that the registration of the sensor 21 is completed (NOTICE (7)).

Figure 9:
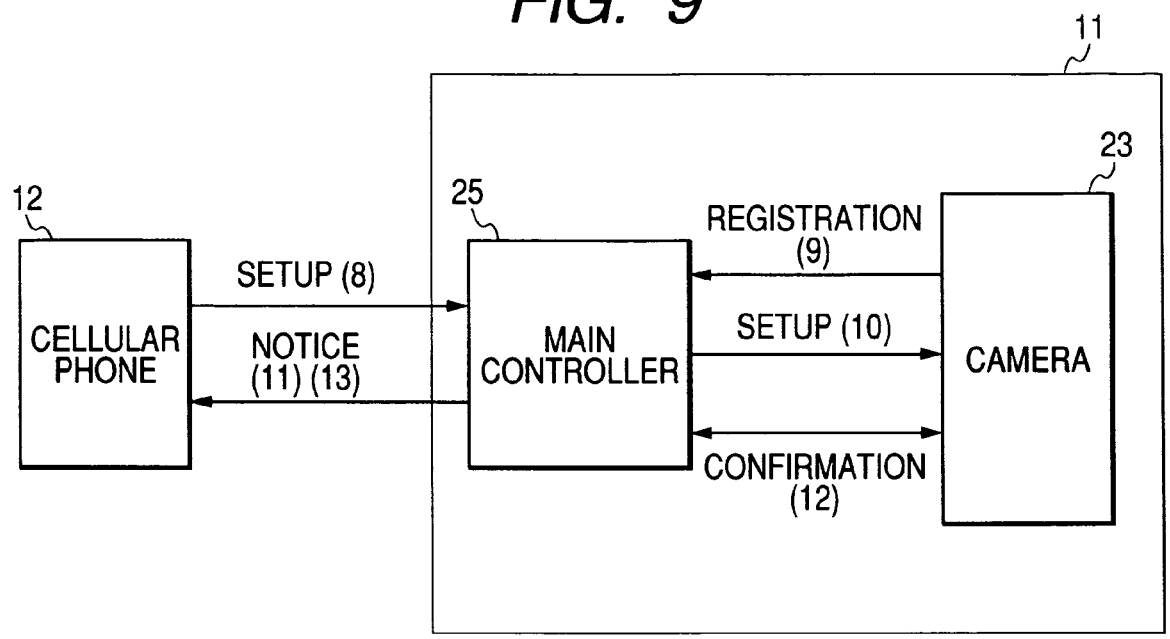
FIG. 9 is a block diagram showing a flow (data transmission and reception) when various kinds of setups and registration of the security system are performed, in accordance with an embodiment of the invention.

Next, the registration of the camera 23 will be described with reference to FIG. 9. First, after the initial setup of the main controller 25 is performed, the main controller 25 is set to be in the registration mode state (SETUP (8)). Then, while the main controller 25 is in the registration mode state, the registration button of the camera 23 is pressed. Next, a registration command is transmitted from the camera 23 to the main controller 25 by the specified low-power radio communication (REGISTRATION (9)). When receiving the registration command of the camera 23 during the registration mode state, the main controller 25 transmits data required for the setup of the wireless LAN system to the camera 23 by the specified low-power radio communication (SETUP (10)).

When receiving data required for the setup of the wireless LAN system, the camera 23 performs the setup of the wireless LAN system of itself. Then, when the setup of the wireless LAN system is completed, the camera 23 transmits to the main controller 25 by the specified low-power radio communication, a notice indicating that the setup of the wireless LAN system is completed (NOTICE (11)). When receiving the notice of the setup completion from the camera 23, the main controller 25 performs a communication (PING) for confirming whether or not the communication is normally performed by the wireless LAN system (CONFIRMATION (12)). When confirming that the communication with the camera 23 is normally performed, the main controller 25 registers the camera 23. Then, the main controller 25 transmits, to the cellular phone 12, data representing that the registration of the camera 23 is completed. For a notice to user, the cellular phone 12 displays a content indicating that the registration of the camera 23 is completed (NOTICE (13)).

Moreover, in this embodiment, in order to set the main controller 25 to be in the registration mode state, the registration button provided in the main controller 25 is pressed. However, the invention is not limited to this configuration. For example, a command may be transmitted from the cellular phone 12 to the main controller 25 so as to switch the main controller 12 to the registration mode state, and the main controller 25 may receive the command so as to be switched to the registration mode state.

Further, when the main controller 25 is in a normal mode state (not the registration mode state), and when the registration button of the camera 23 or the sensor 21 is pressed, the registration command may be transmitted to the main controller 25. In this case, however, the main controller 25 does not perform the registration of the camera 23 or the sensor 21. The main controller 25 confirms whether or not the wireless communication from the camera 23 or the sensor 21 to the main controller 25 is normally performed on the basis of the received registration command. That is, the main controller 25 has a wireless reception confirmation function. When confirming that the wireless communication is normally performed, the main controller 25 transmits a notice mail representing the confirmation to the registered mail address.

Next, various kinds of setups of the security system 1 are performed. Various kinds of setups are performed by accessing a prescribed address and displaying a menu according to the security system 1, with the registered cellular phone 12. In the menu, for example, a security setup, a registration information setup, and the like are included.

[B-1: Security Setup]

The security setup relates to a specific setup of the home security. For example, the security setup relates to a setup of an alert state and a setup of the actuator or the camera.

(Alert Setup)

The alert setup is a menu for setting the alert state of the security system 1. In this embodiment, as the modes representing the alert state, an alert mode and a non-alert mode are included. In the alert mode, the away mode and the home mode are included.

The non-alert mode is a mode which sets the security system 1 to be in a non-alert state. The non-alert state indicates a state in which the security system 1 turns an alert off. In this state, even when the sensor 21 detects the change in state, the detection is not output as a warning.

Further, the alert mode is a mode which sets the security system 1 to be in an alert state. The alert state indicates a state in which the security system 1 is on the alert. In this state, when the sensor 21 detects the change instate (abnormality), a warning can be output.

Further, the away mode is a mode which sets all the sensors 21 to be in the alter states. Further, the home mode is a mode which is used when a person stays in the house, but he wants to detect a trespass in the house by a suspected person. That is, the home mode is a security state between the non-alert mode and the away mode. When the home mode or the away mode is selected, the security system 1 is in the alert state.

Figure 10:
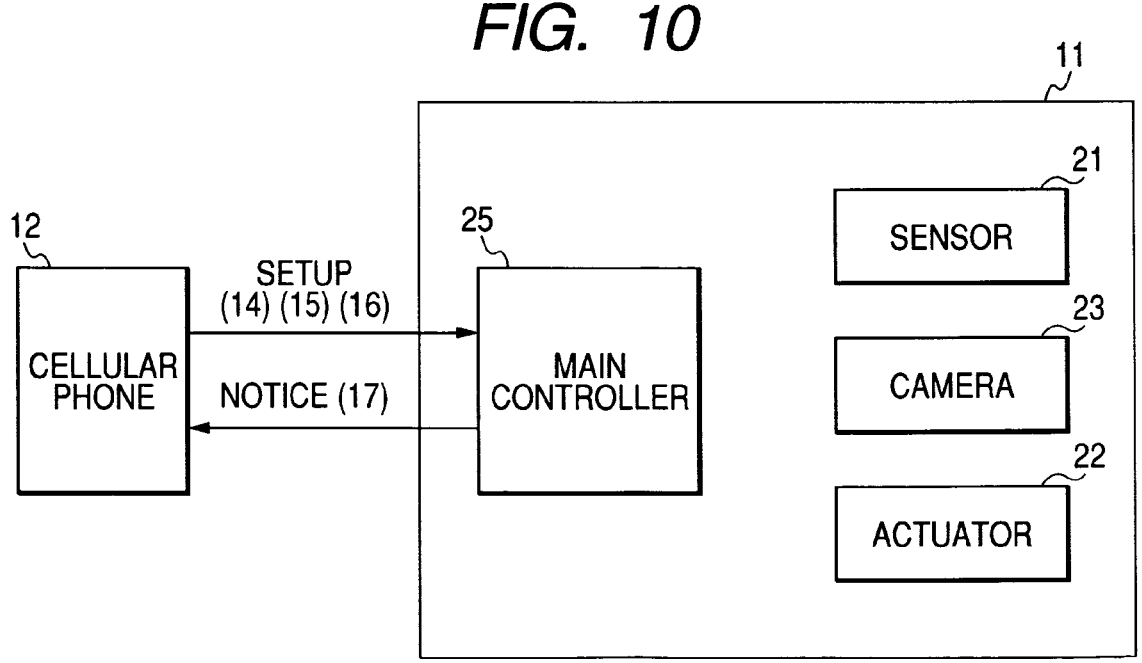
FIG. 10 is a block diagram showing a flow (data transmission and reception) when various kinds of setups and registration of the security system are performed, in accordance with an embodiment of the invention.
Figure 11:
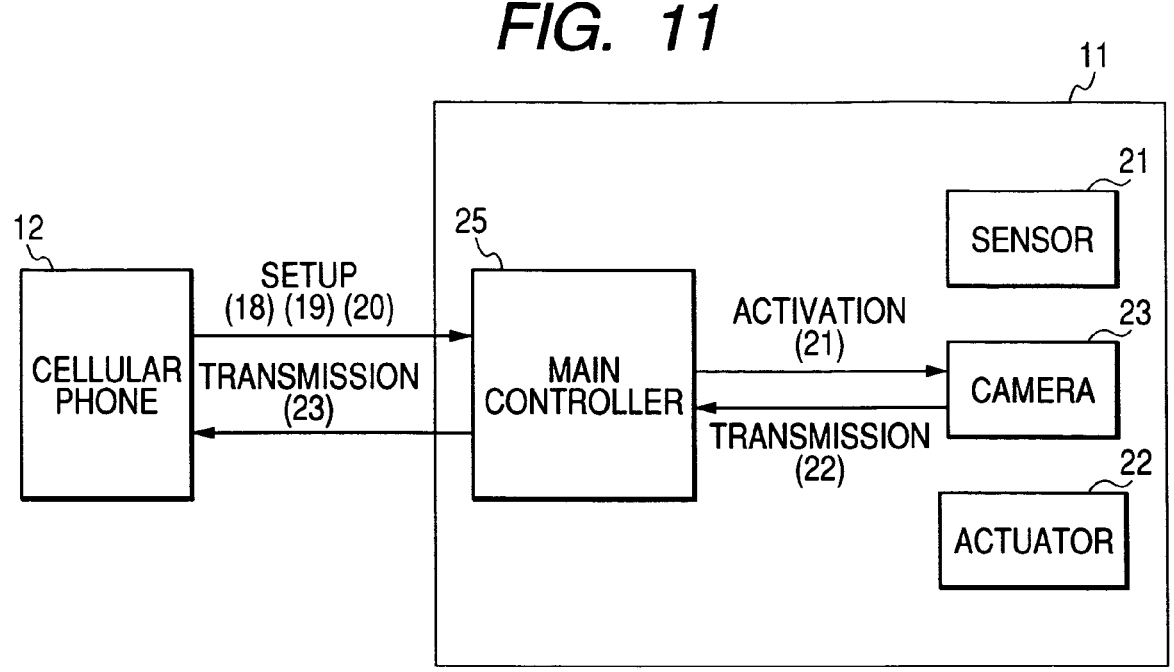
FIG. 11 is a block diagram showing a flow (data transmission and reception) when various kinds of setups and registration of the security system are performed, in accordance with an embodiment of the invention.
Figure 12:
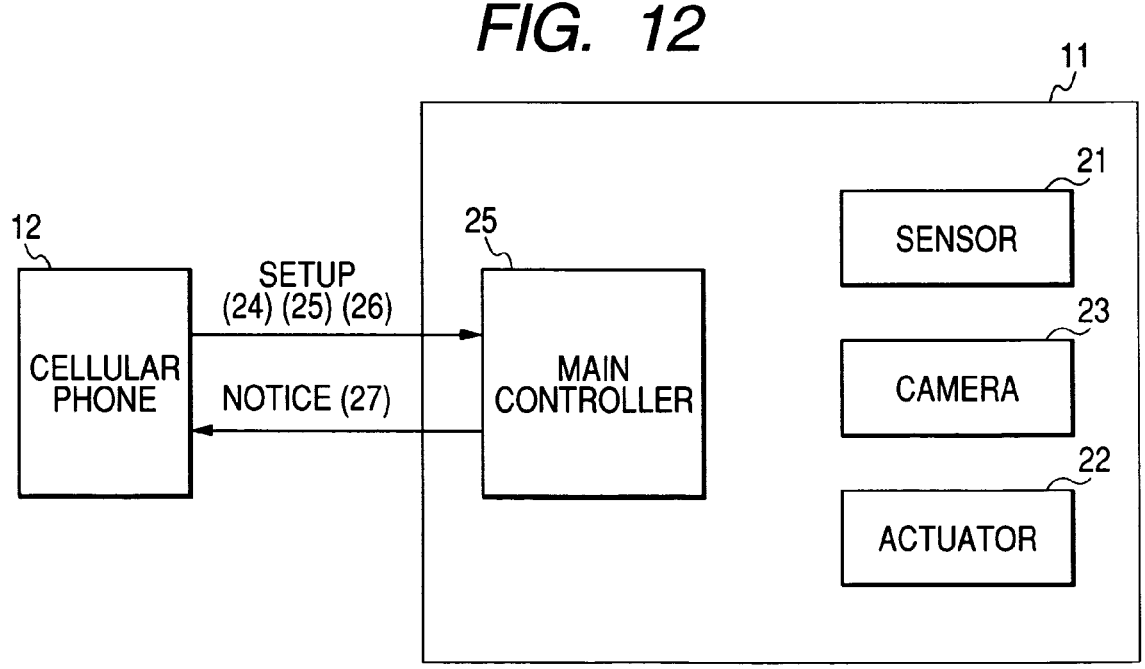
FIG. 12 is a block diagram showing a flow (data transmission and reception) when various kinds of setups and registration of the security system are performed, in accordance with an embodiment of the invention.

Next, a method of performing the alert setup of the security system 1 will be described with reference to FIG. 10. First, an access to the main controller 25 is made by using the registered cellular phone 12 (SETUP (14)). Next, a login screen for inputting the ID and the password registered in the initial setup is displayed. Moreover, when a notice such as a system maintenance message or the like is received, that notice may be displayed-on the login screen.

Then, when a login is made by inputting the ID and the password (SETUP (15)), a screen of a main menu is displayed. Moreover, considering that the registered password is forgotten, a menu for giving notice of the password may be provided. In this case, when the menu for giving notice of the password is selected, a screen for inputting the ID is displayed. When a correct ID is input, the registered password may be noticed to the registered mail address. Then, the login screen may be displayed.

In the main menu, a menu for accessing the home security and a menu (registration information setup) for accessing menu of a change of or an addition to the registered setup is displayed. Further, when information (for example, a warning regarding lowering of the remaining battery level) which is necessarily noticed to the user of the security system 1 exists, the information is preferably displayed on the main menu.

When the menu for accessing the home security is selected on the main menu, a screen of a setup menu regarding the home security is displayed. On the screen of the setup menu, a current alert state is displayed. When the alert mode is changed, another alert mode (any alert mode, which is not currently set, among "away mode", "home mode" and "alert off") is selected (SETUP (16)). Accordingly, display indicating that the changed alert state is selected is performed, and simultaneously a new setup is displayed on the setup screen as the current alert state (NOTICE (17)). By doing so, the alert state can be changed and set.

Moreover, when the alert state is changed, the changed alert state is displayed on the cellular phone 12, but a mail indicating that the alert state is changed may be transmitted from the main controller 25 to the cellular phone 12.

Further, when the menu for accessing the setup screen of the actuator 22 is selected on the main menu, the actuator setup screen is displayed. Further, when the menu for accessing the setup screen of the camera 23 is selected on the main menu, the setup screen of the camera or a screen for displaying the image taken by the camera is displayed.

(Actuator Setup)

The actuator setup is a menu for performing the setup regarding the actuator 22. The actuator setup includes a setup for forcibly driving the actuator 22 regardless of the presence/absence of the abnormality. In this case, driving time or the like can be set. When the menu for accessing the setup screen of the actuator 22 is selected on the main menu, the actuator setup screen is displayed.

Moreover, when the alert mode is being selected, the setup regarding the actuator 22 to be driven when the abnormality occurs may be performed. For example, when any one sensor detects the abnormality, the setup to determine which actuator 22 is to be driven, the setup of driving time, a setup of intensity of sound or light, and the like can be performed.

(Camera Setup)

The camera setup is a menu for performing the setup regarding the camera 23. Specifically, the camera setup is a menu for viewing the image taken by the camera 23. The setup regarding the camera 23 includes, for example, an imaging setup, an image update setup, an image history setup, and the like.

When the menu for accessing the setup screen of the camera 23 is selected on the main menu, a screen for selecting the registered camera 23 is displayed. Here, when the registered camera 23 is selected (when a plurality of registered cameras exist, one of them is selected) an access is made to the image taken by the selected camera 23 so as to view the image. Further, on the setup screen of the camera 23, the setup of imaging resolution or the setup for turning on/off an illumination can be performed.

Moreover, the imaging setup is a setup regarding imaging by the camera 23. As the items of the imaging setup, for example, the number of images (in case of a still picture), imaging time (in case of a motion picture), an imaging angle (when a pan/tilt function exists), and the like are included.

Further, when a predetermined process is executed on the image data taken at the time of the occurrence of the abnormality, a setup for the process can be performed. For example, when the abnormality occurs due to the trespass of the suspected person, the setup may be performed such that a process is executed so as to detect a face of the suspected person and display that on magnified scale. Further, even when the abnormality does not occur, when the image of the security region needs to be taken by the camera 23, an imaging instruction may be made in the imaging setup, so that imaging can be performed.

The image update setup is a setup regarding an update of the image taken by the camera 23. For example, when the camera 23 is set so as to take images at a predetermined interval, the interval may be set. Further, the setup can be manually performed.

The image taken by the camera 23 can be stored in the storage device of the main controller 25. In the image history setup, types of images to be stored among the images previously taken, the storage period of each image to be stored, and the like can also be set.

Moreover, an access to the camera 23 may be made from the main menu so as to make the camera 23 perform imaging, and then the taken images may be transmitted to the cellular phone 12 to be displayed thereon. This method will be described with reference to FIG. 11.

First, the ID and the password are input on the login screen, so that the main menu is displayed (SETUP (18), (19)). Next, a menu for allowing the camera 23 to take the image is selected on the main menu (SETUP (20)). From the menu, the camera 23 is activated, and an instruction to take an image is made. Accordingly, from the main controller 25 to the camera 23, an activation signal is transmitted, and simultaneously an instruction signal to take the image is transmitted (ACTIVATION (21)). The activation signal and the instruction signal are transmitted by using the specified low-power radio communication.

When receiving the activation signal and the instruction signal, the camera 23 is activated so as to take a predetermined image. Then, image data taken is transmitted to the main controller 25 (TRANSMISSION (22)). The image data is transmitted by using the wireless LAN system. The main controller 25, which has received the image data, transmits the image data to the cellular phone 12 through the network (TRANSMISSION (23)). Accordingly, the user can view the image which is instructed to be taken with the cellular phone 12.

[B-2: Registration Information Setup]

The registration information setup relates to the setup change of the registration information of the security system 1. The setup change will be described with reference to FIG. 12. First, the ID and the password are input on the login screen, and the main menu is displayed (SETUP (24), (25)). Then, a menu for displaying the registration information setup on the main menu is selected, and thus the menu of the registration information setup is displayed (SETUP (26)). As the contents to be set from the menu of the registration information setup, for example, operation history of the sensor, time adjustment, setup of the mail address, software update, device management, change of the password, and the setup of the actuator are included. Further, when various kinds of setups or setup change are completed, the setup (change) completion is noticed from the main controller 25 to the cellular phone 12 (NOTICE (27)).

When the menu regarding the operation history of the sensor 21 is selected on the menu of the registration information setup, the operation history of the sensor 21 is displayed. As such, in this embodiment, the security system 1 may store information (abnormality history information) regarding the previous operation history (a history of abnormality) of the sensor 21 in the storage device of the main controller 25. As the operation history of the sensor 21 to be displayed, for example, operation date and time, an operated sensor, the detection contents, and the like are included. Further, the number of cases of the operation history of the sensor 21 to be displayed can be appropriately set. In addition, display may be performed from the latest operation history or from the oldest operation history. Further, when imaging by the camera 23 is performed, together with the operation of the sensor 21, corresponding image data may be confirmed.

When the menu regarding the time adjustment is selected on the menu of the registration information setup, a screen of a time setup is displayed. Further, on the screen, information regarding a current automatic update can be displayed, and ON/OFF of the automatic update can be changed. Further, when a menu for automatically setting a time is selected on the screen of the time setup, the time may be automatically set by referring to a clock server on the network or the time attached to other data. In addition, when a menu for manually setting the time is selected on the screen of the time setup, a screen for setting the time is displayed, and thus the time can be manually set.

When a menu regarding the setup of the mail address is selected on the menu of the registration information setup, a menu for changing various kinds of setups of the mail address is displayed. On the menu of the mail address setup, addition, deletion, and change of the mail address can be performed. By selecting "addition" on the menu of the mail address setup, a mail address to be added can be registered. Further, when "change" is selected on the menu of the mail address setup, the registered mail addresses are displayed. Then, a mail address to be changed can be selected from the displayed addresses, and then the selected mail address can be changed. Further, when "deletion" is selected on the menu of the mail address setup, the registered mail addresses are displayed. Then, from the registered mail addresses, a mail address to be deleted can be selected, and then the selected mail address can be deleted.

When a menu regarding the software update is selected on the menu of the registration information setup, a screen for updating software is displayed. When a menu representing "update" is selected on the screen, software is updated through the connection to Internet. When the software update is completed, a screen for giving a notice purporting that the software update is completed is displayed. Moreover, when the software update is not required, even when the menu purporting "update" is selected, a content indicating that software to be updated does not exist is displayed, and the update is not performed.

When a menu regarding the device management is selected on the menu of the registration information setup, a menu for managing devices is displayed. On the menu for managing the devices, for example, a list of registered devices (the sensor 21, the camera 23, the actuator 22, and the like) is displayed. Further, when the list of devices is displayed, a device to be registered as the security system 1 can be suitably selected from the list. Further, from the list of devices, an arbitrary device can be selected, and then the name of the device can be changed. Further, from the list of devices, an arbitrary device can be selected, and then the device can be deleted from the list.

When a menu regarding the change of the password is selected on the menu of the registration information setup, a change menu of the password is displayed. By inputting a current password and a new password on the screen of the change menu, the password can be changed. Further, when the password is changed, a screen indicating that the password is changed is displayed on the cellular phone 12.

Further, when a menu regarding the setup of the actuator is selected on the menu of the registration information setup, a screen for setting the driving setup (ON/OFF) and the driving time of each of the registered actuators 22 is displayed, and then the driving setup and the driving time of the actuator 22 can be suitably set.

Moreover, when an error occurs in the individual conditions described above, a screen for displaying the error is displayed on the cellular phone. Further, in order to stop the use of services of the security system 1, the user can input the password on a screen for stopping the use of the services.

[C: Security Method]

By performing various kinds of setups or registration, the security system 1 can be used. Moreover, when the alert state is in the non-alert mode, even when the data is transmitted from the individual sensors 21, the main controller 25 does not give a notice indicating that abnormality occurs. Further, when the alert state is in the home mode, as for data transmitted from the sensor 21 installed in the house, the main controller 25 does not give notice of abnormality.

On the other hand, even in the home mode, when data indicating that abnormality occurs is transmitted from the sensor 21 installed outside the house, the main controller 25 transmits the notice of abnormality by mail. Accordingly, even when the user stays in the house, the trespass by the suspected person from the outside can be detected. Further, when the alert state is in the away mode, and when data indicating that abnormality occurs is transmitted from the individual sensors 21, the main controller 25 transmits the notice of abnormality by mail.

Figure 13:
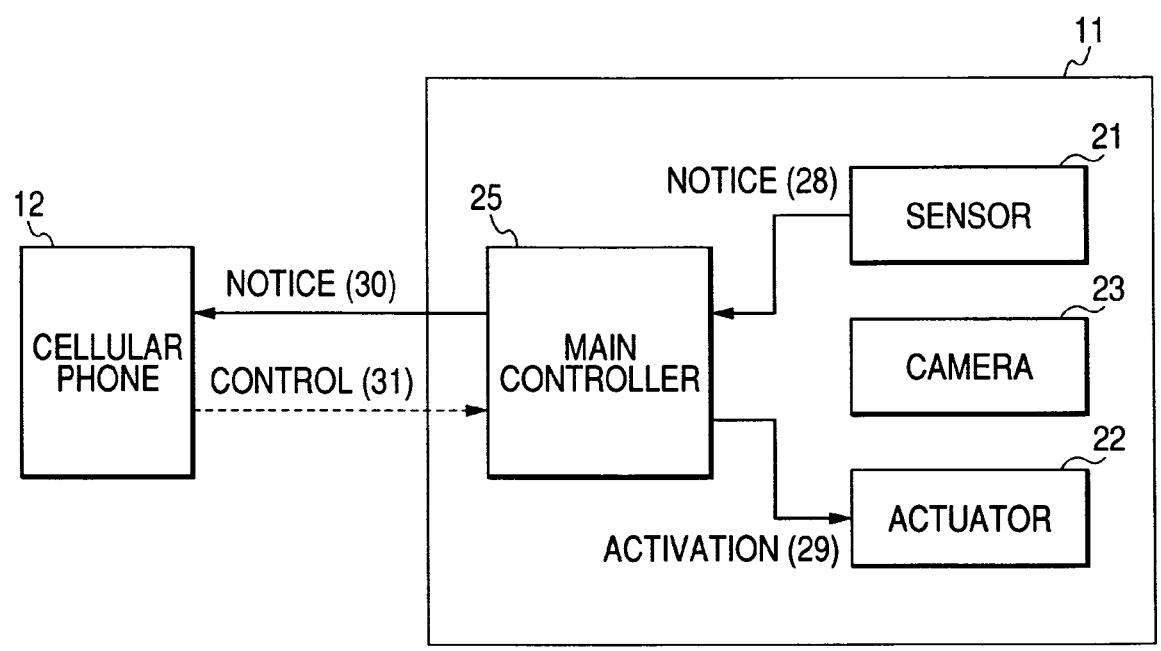
FIG. 13 is a block diagram showing a flow (data transmission and reception) when various kinds of setups and registration of the security system are performed, in accordance with an embodiment of the invention.

Here, a method of performing a security by using the security system 1 will be described with reference to FIG. 13.

Hereinafter, a security method or a monitoring method when the security system 1 is set to be in the away mode will be described.

First, as described above, the user accesses to the main controller 25 from the cellular phone 12 and selects the away mode from the items of the main menu. Accordingly, the security system 1 is set to be in the away mode. Then, the main controller 25 is in a state which can receive the notice of abnormality (detection result) from all the sensors 21, and can recognize the abnormality.

When any one sensor 21 of the sensors 21 detects abnormality, a content indicating that the abnormality is detected is noticed to the main controller 25 (an abnormality command is transmitted) (NOTICE (28)). When receiving the abnormality command, the main controller 25 transmits an activating signal to the registered and set actuator 22 (ACTIVATION (29)). The actuator 22 performs a predetermined operation (menace or the like) according to the activating signal. Further, when receiving the abnormality command, the main controller 25 transmits an abnormality notice mail to the cellular phone 12 (NOTICE (30)). Through the abnormality notice mail, the occurrence of abnormality, a type of abnormality, the type of a sensor which detects abnormality, the time when abnormality occurs, and the like are noticed. The transmission of the abnormality notice mail is preferably performed simultaneously with the transmission of the activating signal to the actuator 22.

Moreover, when the sensor 21 detects the abnormality, the main controller 25 may drive the camera 23 in connection with the sensor 21. In this case, when the main controller 25 receives the abnormality command transmitted from the sensor 21, the imaging instruction is made to the camera 23 which can take the image of a place where abnormality occurs. The camera 23 takes the image on the basis of the imaging instruction transmitted from the main controller 25, and transmits the image data to the main controller 25. When the sensor 21 is in connection with the camera 23, an address for accessing the image data taken by the camera 23 maybe noticed through the abnormality notice mail.

Moreover, the judgment whether or not the change in state is "abnormal" may be performed by the sensor 21 which detects the change in state or by the main controller 25. In this embodiment, the judgment is performed by the sensor 21. In this case, when detecting the change in state, the sensor 21 compares the degree of change in state with the threshold value for judging whether or not abnormality occurs. When the degree of change in state exceeds the threshold value, it is judged that abnormality occurs. The threshold value is stored in the sensor control section of each of the sensors 21 in advance.

On the other hand, the judgment whether or not abnormality occurs may be performed by the main controller 25. In this case, when detecting the change in state, the sensor 21 gives notice of the detection of the change in state and the degree of change in state to the main controller 25. The main controller 25 stores the threshold value in association with the sensor 21 for judging whether or not abnormality occurs, in the storage device in advance, and compares the change instate noticed from the sensor 21 with the threshold value in association with the sensor 21. When it is judged that the degree of change in state exceeds the threshold value, the main controller 25 judges that the change in state detected by the sensor 21 is the abnormal state, and transmits the abnormality notice mail to the cellular phone.

Here, the operation of the security system 1 when abnormality occurs will be described. First, as described above, when any one sensor 21 detects abnormality, the sensor 21 gives notice to the main controller 25 indicating the abnormality is detected. When receiving the notice of abnormality, the main controller 25 transmits the activating command to the actuator 22 registered in the main controller 25. The actuator 22 operates (threatens) in response to the activating command from the main controller 25. The main controller 25 transmits the activating command to the actuator 22, and simultaneously transmits the abnormality notice mail to the registered mail address.

Accordingly, the user can be noticed that abnormality occurs. Further, if necessary, by accessing the main controller 25, the user can perform the imaging instruction to the camera 23, confirm the image taken by the camera 23, or additionally activate the actuator 22 so as to perform the threatening (CONTROL (31)).

Here, a method in which the user performs the imaging instruction to the camera 23 from the cellular phone 12 or accesses the image already taken will be described.

As described above, first, the user accesses the main menu of the security system 1 by the cellular phone 12. Next, the user selects the item for displaying the menu of the home security from the main menu, and selects the item for transmitting the imaging instruction to the camera from the menu of the home security. Then, when the list of cameras 23 registered in the security system 1 is displayed, the user selects the camera to access.

Accordingly, the main controller 25 transmits the imaging instruction to the selected camera 23. The transmission of the imaging instruction is performed by the specified low-power radio communication. Further, when receiving the imaging instruction from the main controller 25, the camera 23 is activated so as to take the image, and transmits the taken image data to the main controller 25. The transmission of image data is performed by the wireless LAN system. Then, the main controller 25 transmits image data to the cellular phone 12. Accordingly, the user can view the image taken by the selected camera 23.

Moreover, the user accesses the history of image data taken by the camera 23 so as to view the images previously taken. In this case, the user may select the item for accessing the images taken by the camera from the main menu. Further, the user selects the setup regarding the actuator 22 from the main menu, thereby forcibly activating the actuator 22.

Moreover, the security system 1 may have an urgent report function, in addition to the functions of detecting and giving notice of abnormality, such as the suspected person, fire, or the like. Specifically, for example, a function of calling an ambulance when the user is in bad health, a function of reporting an arrival of bath time to his family through a sensor provided in a bath, or a function of monitoring a life as a whole such as gas leakage, and the like can be exemplified.

Further, the camera 23 is not limited to one used in the security system 1. For example, a combination of the camera 23, and a control device such as a main controller for controlling the camera 23 can be used.

(Modifications)

(First Modification of Camera)

In the above description, the camera communication control section 68 judges the types of communication data, and switches (selects) the first camera communication section 61 and the second camera communication section 62 accordingly. That is, in this case, the camera communication control section 68 has a section for discriminating the types of communication data, and, whenever data is transmitted, the discriminating section discriminates the type of transmission data.

However, as the type of data to be discriminated, for example, the data amount may be used. In this case, the camera communication control section 68 measures the data amount of transmission data. When the measured data amount is equal to or larger than a predetermined value, the camera communication control section 68 selects the wireless LAN system. On the other hand, when the measured data amount is smaller than the predetermined value, the camera communication control section 68 selects the specified low-power radio communication.

(Second Modification of Camera)

Further, in the above description, the camera 23 images the state when abnormality occurs, but does not have a function of a sensor detecting abnormality. However, like the individual sensors described above, the camera 23 may be used to detect abnormality.

As an example in which the camera 23 is also used as the sensor, a first example in which abnormality is detected by using taken image data, and a second example in which a built-in sensor 50a is provided in the camera 23 can be exemplified.

In case of the first example, preferably, imaging by the camera 23 is set to be automatically performed at predetermined time intervals.

Further, in this case, on the basis of the taken image data, presence/absence of abnormality is judged. As for presence/absence of abnormality, a comparison of image data taken at predetermined time intervals is made, and, when it is judged that a change in the state is generated, it is judged that the abnormality occurs. The judgment of presence/absence of abnormality may be performed by the camera 23 or by the main controller 25.

When the judgment of presence/absence of abnormality is performed by the camera 23, a threshold value is stored in the camera control section 63. Then, the camera control section 63 compares a degree of change based on the image data with the threshold value, and when the degree of change exceeds the threshold value, judges that the abnormality occurs. On the other hand, when the judgment of presence/absence of abnormality is performed by the main controller 25, the camera 23 transmits the image data taken at the predetermined time intervals to the main controller 25 whenever the image data is taken. Then, the main controller 25 judges presence/absence of the abnormality on the basis of the image data.

Figure 16:
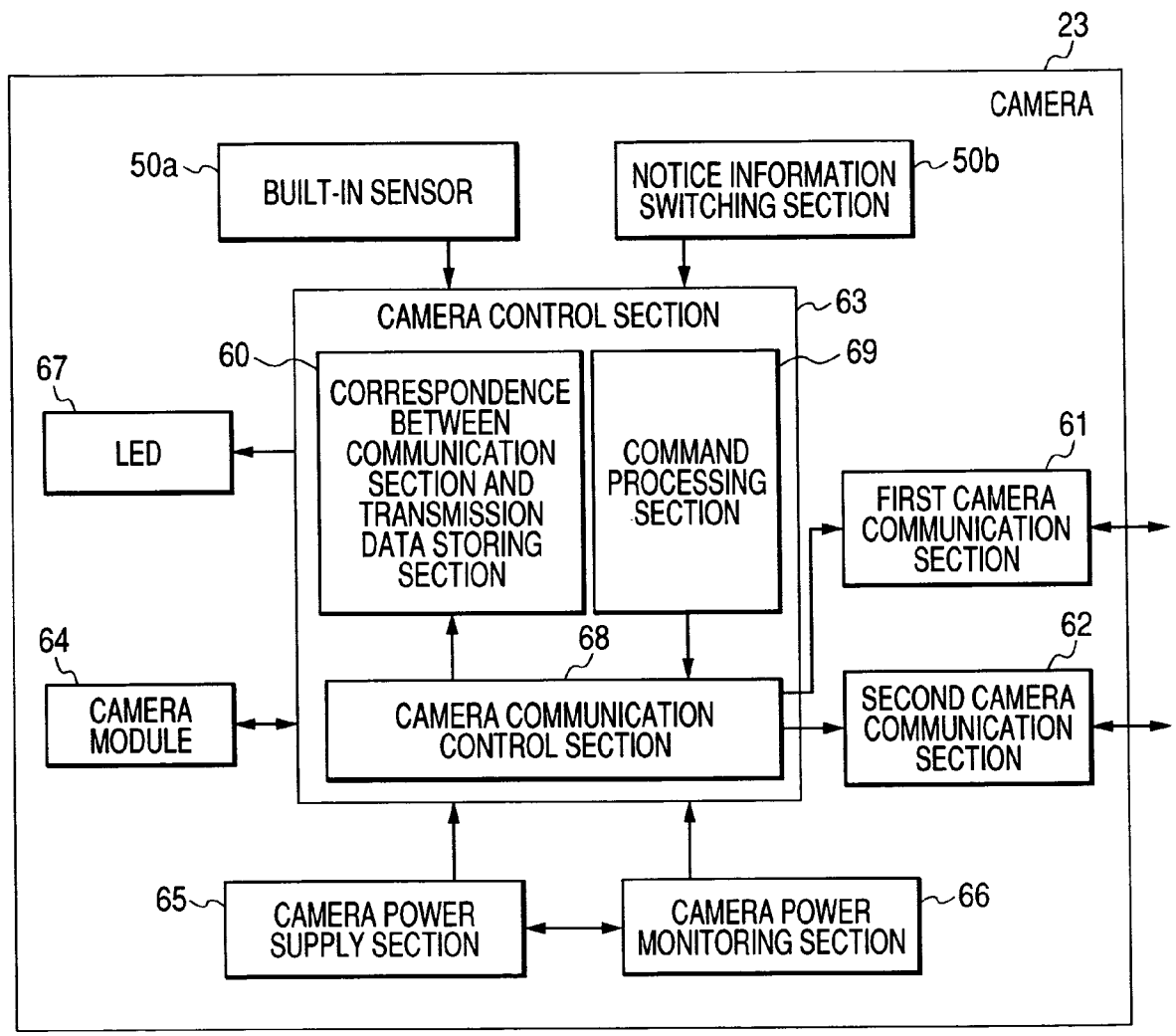
FIG. 16 is a block diagram showing a modified example of an internal configuration of a camera according to an embodiment of the invention.

In case of the second example, as shown in FIG. 16, the camera 23 has the built-in sensor 50a. The built-in sensor 50a is, for example, an infrared sensor which can detect a human body.

In case of the second example, when detecting the abnormality (here, when detecting the human body), the built-in sensor 50a outputs an abnormality notice command to the camera control section 63.

As such, on the basis of the degree of change on the basis of the image data in the first example, and on the basis of the abnormality notice command from the built-in sensor 50a in the second example, the camera control section 63 can recognize that the abnormality occurs.

An example of a processing when the camera control section 63 recognizes the occurrence of the abnormality will now be described with reference to a flowchart of FIG. 17. Moreover, hereinafter, the description will be given by way of the second example, but the same can be applied to the first example.

Moreover, as shown in FIG. 16, the camera 23 has a notice information switching section 50b. The notice information switching section 50b switches information to be noticed to the main controller 25 when the built-in sensor 50a detects the abnormality, into one of the notice data indicating that the abnormality is detected and the image data taken immediately after the abnormality is detected. The notice information switching section 50b switches information to be noticed according to a setup instruction from the user. Moreover, the setup instruction is transferred from the cellular phone 12 through the main controller 25.

First, the command processing section 69 of the camera control section 63 judges presence/absence of the abnormality notice command from the built-in sensor 50a (Step S21). When receiving the abnormality notice command from the built-in sensor 50a, the command processing section 69 confirms the notice information set by the notice information switching section 50b, and judges whether or not the notice information includes the image data (Step S22).

If the notice information doe not include the image data (No at the step S22), that is, if the notice information is only the notice data, the command processing section 69 generates abnormality notice data indicating that the abnormality is detected, and outputs the abnormality notice data to the camera communication control section 68. Moreover, the data identification information of the abnormality notice data is "NOTICE". Then, since the data identification information "NOTICE" is not stored in the correspondence between communication section and transmission data storing section 60, the camera communication control section 68 transmits the abnormality notice data by using the first camera communication section 61 (Step S23). Then, the camera 23 ends the processing.

On the other hand, if the notice information includes the image data (Yes at the step S22), the command processing section 69 activates the camera module 64, the LEDs, and the second camera communication section 62 (Step S24). Then, the command processing section 69 transmits the image data taken by the camera module 64 only for the predetermined time, to which abnormality detection time information indicating the reception time of the abnormality notice command (that is, abnormality detection time) is added, to the camera communication control section 68. The camera communication control section 68 transmits the image data, to which the abnormality detection time information is added, by using the second camera communication section 62 (Step S25). Then, the camera 23 ends the processing.

Moreover, in the main controller 25, the security management control section 89 stores the image data, to which the abnormality detection time information is added, received by the second communication section 82 in the storage device 86.

Next, when receiving the transfer request instruction of the past image from the cellular phone 12 through the external communication section 83, the communication control section 88 of the main controller 25 reads out the image data corresponding to the abnormality detection time assigned by the transfer request instruction from the storage device 86. Then, the communication control section 88 transmits the read image data to the cellular phone 12, which is the transmission source of the transfer request instruction, through the external communication section 83.

In the above description, image data taken when the built-in sensor 50a incorporated into the camera 23 detects abnormality is stored in the storage device 86 of the main controller 25. However, the invention is not limited to this configuration.

For example, when receiving the abnormality notice command from the built-in sensor 50a, the command processing section 69 of the camera control section 63 may drive the camera module 64 and the LEDs and store image data taken by the camera module 64 in a built-in storage device (not shown). Then, when receiving the transfer request instruction of the past image from the cellular phone 12 through the external communication section 83, the communication control section 88 of the main controller 25 may transmit a command (past image transfer request command) requesting to transfer image data corresponding to the abnormality detection time added to the transfer request instruction, to the camera 23 by using the first communication section 81. When receiving the past image transfer request command, the command processing section 69 of the camera 23 may drive the second camera communication section 62. Then, the command processing section 69 may read out the image data designated by the past image transfer request command from the built-in storage device, and output the image data to the camera communication control section 68. At this time, the command processing section 69 may also add the data identification information "IMAGE" to the image data. Then, the camera communication control section 68 may transmit the image data to the main controller 25, and the communication control section 88 of the main controller 25 may transmit the received image data to the cellular phone 12, which is the transmission source of the transfer request instruction, by using the external communication section 83.

Further, the image data taken when the built-in sensor 50a incorporated into the camera 23 detects the abnormality may be stored in a network server, instead of the main controller 25. The user can access network server by using the cellular phone 12 and download the image data of desired abnormality detection time.

(Third Modification of Camera)

In the above description, the correspondence between communication section and transmission data storing section 60 stores the data identification information (data identification information for second communication) indicating the content (type) of transmission data to be transmitted by the second camera communication section 62. However, the correspondence between communication section and transmission data storing section 60 may store a table in which the data identification information indicating the content (type) of transmission data is associated with the communication section (here, the first camera communication section 61 and the second camera communication section 62), which is used to transmit the transmission data.

For example, as shown in FIG. 18, the correspondence between communication section and transmission data storing section 60 stores a table in which the data identification information "IMAGE" is associated with the second camera communication section 62 (in FIG. 18, described as the wireless LAN communication), and the data identification information "NOTICE" and "RESPONSE" is associated with the first camera communication section 61 (in FIG. 18, described as the specified low-power radio communication).

By referring to this table, the camera communication control section 68 may select a communication section corresponding to the data identification information extracted from the transmission data.

(Fourth Modification of Camera)

The camera 23 may have a microphone and generate sound data synchronized with the image data as the transmission data. In this case, the command generating section adds the data identification information "SOUND" to the sound data.

Further, the sound data is the transmission data whose usual data amount is supposed to be larger than a predetermined threshold value (for example, 1 Kbyte). That is, the sound data is the transmission data whose usual time required to be transmitted at the communication speed of the specified low-power radio communication is more than a predetermined time (for example, 20 seconds). For this reason, in the correspondence between communication section and transmission data storing section 60, "SOUND" is stored as the data identification information for second communication. Accordingly, sound data can be transmitted through the wireless LAN system.

(First Modification of Main Controller)

The security management control section 89 may perform a predetermined processing on the image data transmitted from the camera 23. For example, in the above description, when the user wants to enlarge/reduce the taken image, the main controller 25 transmits the imaging control command to the camera 23. However, in a case where only a specified portion of the image data taken by the camera 23 is set to be enlarged and displayed, the security management control section 89 may cut the portion to be enlarged from the image. The specified portion is, for example, a face of the trespasser when abnormality is caused by the trespass of the suspected person.

(Second Modification of Main Controller)

In the above description, the main controller 25 constantly drives the second communication section 82. However, the invention is not limited to this configuration. For example, the main controller 25 may drive the second communication section 82 only when necessary, like the camera 23. Accordingly, low power consumption of the main controller 25 can be realized.

Specifically, at the time of the activation, the main controller 25 drive only the members excluding the second communication section 82, and maintains the second communication section 82 in a sleep state. Then, when transmitting the image transfer request command by using the first communication section 81 or when receiving the response thereto, the communication control section 88 drives the second communication section 82, and waits to receive data to be transmitted by the wireless LAN system (here, image data). Then, at the end time of the reception of the image data, the communication control section 88 stops driving of the second communication section 82.

(Third Modification of Main Controller)

In the above description, when receiving the transfer request of the current image from the cellular phone 12, the main controller 25 transmits the image transfer request command to the camera 23. However, the invention is not limited to this configuration. For example, when receiving the notice of abnormality from the sensor 21, the main controller 25 may transmit the image transfer request command to the camera 23, which is associated with the sensor 21 in advance.

Specifically, the security management control section 89 judges whether or not the first communication section 81 receives the notice of abnormality from the sensor 21. Then, when the first communication section 81 receives the notice of abnormality, the security management control section 89 generates the image transfer request command to the camera 23 previously associated with the sensor 21 which transmits the notice of abnormality, and outputs the generated image transfer request command to the communication control section 88. Then, the communication control section 88 transmits the image transfer request command by using the first communication section 81.

Next, the security management control section 89 confirms that the first communication section 81 receives response data to the image transfer request command. Then, the second communication section 82 receives the image data.

Next, the security management control section 89 stores the image data in the storage device 86, the image data being received by the second communication section 82, in association with the time at which the sensor 21 detects abnormality.

Next, the security management control section 89 judges whether or not the external communication section receives the transfer request instruction of the past image from the cellular phone 12. To the transfer request instruction of the past image, the abnormality detection time is added.

When receiving the transfer request instruction of the past image, the communication control section 88 reads out the image data corresponding to the abnormality detection time added to the transfer request instruction, from the storage device 86. Then, the communication control section 88 transmits the read image data to the cellular phone 12 which is the transmission source of the transfer request instruction, by using the external communication section.

(Others)

In the above description, in order to share the advantage in that the wireless LAN system has the higher communication speed than that of the specified low-power radio communication, data having the large data amount is transmitted by using the wireless LAN system. However, the invention is not limited to this configuration. For example, preferably, in a device which can use a plurality of communication systems, in order to share the advantages of the individual communication systems, the communication system is selected according to the types of transmission and reception data.

For example, the specified low-power radio communication has shorter time for communication establishment than that of the wireless LAN system. In view of the time required for the communication establishment, what communication system is selected to transmission data may be set in advance. That is, the total communication time includes the time for the communication establishment, in addition to transfer time of the transmission data itself. A communication system having the minimum total communication time may be set in advance. Then, in case of this embodiment, when a communication system having the minimum total communication time for a certain type of transmission data is the wireless LAN system, the data identification information indicating the type of the transmission data maybe stored in the correspondence between communication section and transmission data storing section 60.

For example, as for data having large data amount such as the image or sound, since the transfer time of the data itself is longer than the time for communication establishment, the wireless LAN system having the higher communication speed is set such that the transfer time is shortened.

On the other hand, as for the notice of abnormality or the remaining battery level lowering notice, the data amount is smaller than the predetermined threshold value, and thus a ratio of time required for the communication establishment to the total communication time becomes larger. For this reason, the specified low-power radio communication having the shorter time required for communication establishment is set such that the total communication time is minimized.

As such, the determination whether the transmission data is transferred by the specified low-power radio communication or the wireless LAN system is performed according to the data amount of the transmission data, even when the time required for the communication establishment is considered.

Further, since the specified low-power radio communication has a longer communication range than that of the wireless LAN system, when the communication range required for data to be transmitted among the devices is previously supposed to be equal to or larger than a predetermined threshold value, preferably, data communication is performed by the specified low-power radio communication.

For example, for the communication between the sensor 21, the camera 23 or the like provided outdoors (the sensor or the camera provided in a vehicle at a parking lot) and the main controller 25 provided indoors, the specified low-power radio communication may be set. On the other hand, for the communication between the sensor 21 or the camera 23 and the main controller 25 that are provided indoors, the wireless LAN system may be set.

The invention is not limited to the embodiment, but various changes can be made within the scope read on the appended claims. That is, an embodiment by a combination of technical means suitably changed within the scope read on the appended claims also falls within the technical scope of the invention.

Consequently, the individual sections of the camera, in particular, the camera control section may be formed by a hardware logic or may be implemented by software using a CPU, as described below.

That is, the camera has a CPU (central processing unit) that executes commands of a control program for realizing the individual functions, a ROM (read only memory) that stores the program, a RAM (random access memory) that expands the program, and a storage device (recording medium) such as a memory, that stores the program and various kinds of data. Then, the object of the invention can be achieved by supplying a recording medium, in which program codes (an executable format program, an intermediate code program, and a source program) of the control program of the camera serving as software for implementing the above-described functions are readably written, and by allowing a computer to read out and execute the program codes written into the recording medium.

As the recording medium, for example, tapes such as magnetic tapes or cassette tapes, discs including magnetic discs such as Floppy (Registered Trademark) discs or hard discs, or optical discs such as CD-ROM, MO, MD, DVD, or CD-R, cards such as an IC card (including a memory card) or an optical card, or semiconductor memories such as mask ROM, EPROM, EEPROM, or flash ROM, can be used.

Further, the camera may be configured to be connected to a communication network, and the program codes may be supplied through the communication network. The communication network is not particularly limited. For example, Internet, Intranet, Extranet, LAN, ISDN, VAN, CATV communication network, virtual private network, a telephone network, a mobile communication network, a satellite communication network, and the like can be used. Further, a transmission medium constituting the communication network is not particularly limited. For example, a wire system, such as IEEE 1394, a USB, power line transfer, a cable TV line, a telephone line, or an ADSL line, or a wireless system, such as infrared rays of IrDA or a remote control, Bluetooth (Registered Trademark), 802.11 wireless, HDR, a cellular phone network, a satellite line, or a terrestrial digital network, can be used. Moreover, the invention can be realized in forms of a computer data signal embedded in carrier waves which are implemented by electronic transmission of the program codes.

According to the invention, the main controller and the camera perform wireless communication with each other by using communication systems having different communication speeds. Accordingly, the camera can be driven by the battery, and thus full wireless is realized. Therefore, the invention is particularly suitable for a camera, which is used in a wireless situation, and a field of the home security for securing safety inside and outside the house.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A wireless communication apparatus configured to communicate information including data and identification information identifying the data with a controlling apparatus by wireless communication, the wireless communication apparatus comprising:
   a first communicator, configured to perform the wireless communication by using a first communication system;
   a second communicator, configured to perform the wireless communication by using a second communication system having a communication speed higher than the first communication system;
   a storage, storing identification information indicative of specific data which has a data amount no less than a threshold value;
   a selector, configured to extract identification information from information to be sent to the controlling apparatus, the selector being configured to select the first communicator in a case where the extracted identification information is not identical with the identification information stored in the storage, and to select the second communicator in a case where the extracted identification information is identical with the identification information stored in the storage;
   an information acquirer, configured to acquire information related to a state of an environment of a peripheral region of the wireless communication apparatus,
   wherein the information acquirer includes an imaging device configured to image the peripheral region, and the specific data is image data that is imaged by the imaging device;
   a detector, configured to detect an abnormality in the state of the environment; and
   an activator, configured to activate the second communicator and send an instruction to the imaging device to image the peripheral region when the detector detects the abnormality,
   wherein the selector is configured to send the image data according to the instruction from the activator through the second communicator.

2. The wireless communication apparatus according to claim 1,
   wherein the first communication system is a specified low-power radio communication, and
   the second communication system is a wireless LAN (local area network).

3. The wireless communication apparatus according to claim 1, further comprising:
   a transmission request receiver, configured to receive a transmission request of the specific data from the controlling apparatus through the first communicator; and
   wherein the activator is configured to activate the second communicator from a standby state when the transmission request receives the transmission request.

4. A wireless communication system comprising:
   the wireless communication apparatus according to claim 1; and
   a controlling apparatus configured to communicate information with the wireless communication apparatus by wireless communication.

5. The wireless communication apparatus according to claim 1, wherein;
   the wireless communication apparatus is configured to be driven by a battery, and further comprises a data generator configured to judge whether a remaining battery level of the battery is less than a predetermined value, and to generate notification data in a case where it is judged that the remaining battery level is less than the predetermined value; and
   the selector is configured to select the first communicator to send the notification data to the controlling apparatus.

* * * * *

UNITED STATES PATENT AND TRADEMARK OFFICE
CERTIFICATE OF CORRECTION

| | | |
|---|---|---|
| PATENT NO. | : 7,650,144 B2 | Page 1 of 1 |
| APPLICATION NO. | : 11/362800 | |
| DATED | : January 19, 2010 | |
| INVENTOR(S) | : Nakamura et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 861 days.

Signed and Sealed this

Twenty-third Day of November, 2010

David J. Kappos
*Director of the United States Patent and Trademark Office*